(12) United States Patent
Sasaki et al.

(10) Patent No.: US 12,500,296 B2
(45) Date of Patent: Dec. 16, 2025

(54) ALL-SOLID-STATE BATTERY AND METHOD FOR MANUFACTURING SAME

(71) Applicant: DAI NIPPON PRINTING CO., LTD., Tokyo (JP)

(72) Inventors: Miho Sasaki, Tokyo (JP); Ryo Fujiwara, Tokyo (JP); Makoto Amano, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 910 days.

(21) Appl. No.: 17/424,650

(22) PCT Filed: Jan. 23, 2020

(86) PCT No.: PCT/JP2020/002425
§ 371 (c)(1),
(2) Date: Aug. 31, 2021

(87) PCT Pub. No.: WO2020/153457
PCT Pub. Date: Jul. 30, 2020

(65) Prior Publication Data
US 2022/0085444 A1    Mar. 17, 2022

(30) Foreign Application Priority Data
Jan. 23, 2019 (JP) ................................. 2019-009811

(51) Int. Cl.
*H01M 50/126* (2021.01)
*H01M 10/0525* (2010.01)
(Continued)

(52) U.S. Cl.
CPC ..... *H01M 50/126* (2021.01); *H01M 10/0585* (2013.01); *H01M 10/0525* (2013.01);
(Continued)

(58) Field of Classification Search
CPC ......... H01M 10/0562; H01M 10/0585; H01M 50/124; H01M 50/126; H01M 50/103
See application file for complete search history.

(56) References Cited

U.S. PATENT DOCUMENTS

2013/0209868 A1* 8/2013 Suzuta .................... B32B 27/32
    429/176
2016/0118666 A1* 4/2016 Ikenuma ............... H01M 4/621
    429/232
2018/0102514 A1    4/2018 Dai et al.

FOREIGN PATENT DOCUMENTS

JP    2002-208387      *  7/2002
JP    2011-258570  A    12/2011
(Continued)

OTHER PUBLICATIONS

English translation of JP Publication 2002-208387, Jul. 2002.*
Apr. 14, 2020 International Search Report issued in International Patent Application No. PCT/JP2020/002425.

*Primary Examiner* — Brittany L Raymond
(74) *Attorney, Agent, or Firm* — Oliff PLC

(57) ABSTRACT

An all-solid-state battery contained in an exterior material having a barrier layer in which deterioration is effectively suppressed even when the all-solid-state battery is constrained in a high-pressure state. The all-solid-state battery has a battery element contained in a package formed of an exterior material, the battery element includes at least a unit cell including: a positive electrode active material layer; a negative electrode active material layer; and a solid electrolyte layer laminated between the positive electrode active material layer and the negative electrode active material layer, wherein the exterior material is composed of a laminate having, in the following order: at least a barrier layer; a barrier layer protection film formed on the surface of the barrier layer; and a heat-fusible resin layer.

6 Claims, 3 Drawing Sheets

(51) Int. Cl.
H01M 10/0562 (2010.01)
H01M 10/0585 (2010.01)
H01M 50/105 (2021.01)

(52) U.S. Cl.
CPC ...... *H01M 10/0562* (2013.01); *H01M 50/105* (2021.01); *H01M 2220/20* (2013.01)

(56) References Cited

FOREIGN PATENT DOCUMENTS

| | | | |
|---|---|---|---|
| JP | 2012-142228 | * | 7/2012 |
| JP | 2012-142228 A | | 7/2012 |
| JP | 2017-004765 A | | 1/2017 |
| JP | 2018-015986 A | | 2/2018 |
| WO | 2018/79681 A1 | | 5/2018 |
| WO | 2019/017456 A1 | | 1/2019 |

* cited by examiner

ALL-SOLID-STATE BATTERY AND METHOD FOR MANUFACTURING SAME

TECHNICAL FIELD

The present disclosure relates to an all-solid-state battery and a method for manufacturing the all-solid-state battery.

BACKGROUND ART

An all-solid-state battery is known in which an electrolyte is a solid electrolyte. The all-solid-state battery has advantages of high safety and a wide operating temperature range because an organic solvent is not used in the battery.

On the other hand, it is known that the all-solid-state battery is easily delaminated between a solid electrolyte and a negative active material layer or a positive active material layer by expansion and shrinkage of a negative electrode or a positive electrode due to charge/discharge, so that deterioration of the battery is likely to proceed.

As a method for suppressing delamination between the solid electrolyte and the negative active material layer or the positive active material layer, a technique is known in which the all-solid-state battery is constrained in a state of being pressed at a high pressure. For example, Patent Document 1 discloses a method for manufacturing a battery, including: a lamination step of preparing a laminate including a positive electrode current collector, a positive electrode layer, an electrolyte layer, a negative electrode layer and a negative electrode current collector in this order; a pressurization step of pressurizing the laminate prepared in the lamination step in a lamination direction; and a constraining step of constraining the laminate while pressurizing the laminate in the lamination direction at a pressure of 0.1 MPa or more and 100 MPa or less for a predetermined time after the pressurization step.

PRIOR ART DOCUMENT

Patent Document

Patent Document 1: Japanese Patent Laid-open Publication No. 2012-142228

SUMMARY OF THE INVENTION

Problems to be Solved by the Invention

For suppressing delamination between a solid electrolyte and a negative active material layer or a positive active material layer in a use environment of an all-solid-state battery, it is desirable to continuously constrain the solid electrolyte, the negative active material layer and the positive active material layer by high-pressure pressing of the all-solid-state battery from the outside of an exterior material.

On the other hand, in recent years, all-solid-state batteries have been required to be diversified in shape and to be thinned and lightened with improvement of performance of electric cars, hybrid electric cars, personal computers, cameras, mobile phones and so on. However, metallic exterior materials that have often been heretofore used in batteries have the disadvantage that it is difficult to keep up with diversification in shape, and there is a limit on weight reduction. Thus, there has been proposed a film-shaped exterior material with a base material, a metal foil layer and a heat-sealable resin layer laminated in this order has been proposed as an exterior material which is easily processed into diversified shapes and is capable of achieving thickness reduction and weight reduction.

In such a film-shaped exterior material, in general, a space for housing battery elements is provided by molding into a bag shape or molding using a mold, and the battery elements such as an electrode or a solid electrolyte are disposed in the space, and heat-sealable resin layers are heat-sealed to each other to obtain an all-solid-state battery in which battery elements are housed inside the exterior material.

By applying such a film-shaped exterior material to an exterior material of an all-solid-state battery, weight saving of electric vehicles, hybrid electric vehicles and the like is expected.

For suppressing delamination between the solid electrolyte and the negative active material layer or the positive active material layer in a use environment of the all-solid-state battery, it is desirable to continuously constrain the all-solid-state battery from the outside of the exterior material as described above. However, when the solid electrolyte, the negative active material layer and the positive active material layer are continuously constrained in a high-pressure state from the outside of the exterior material of the all-solid-state battery, there is a possibility that the heat-sealable resin layer of the exterior material is strongly pressed against the battery element, and thus the thickness of the heat-sealable resin layer (inner layer) of the exterior material decreases, so that a barrier layer laminated on the exterior material comes into contact with the solid electrolyte. In particular, studies by the inventors of the present disclosure have revealed that if while the barrier layer of the exterior material is in contact with the solid electrolyte, an electric current passes therebetween, an alloy is generated on the surface of the barrier layer, leading to deterioration of the barrier layer. When the barrier layer of the exterior material is deteriorated, the barrier property of the exterior material for the battery element is deteriorated.

In view of these circumstances, a main object of the present disclosure is to provide an all-solid-state battery in which deterioration of a barrier layer of an exterior material is effectively suppressed even when the all-solid-state battery is constrained in a high-pressure state.

Means for Solving the Problem

The present inventors of the present disclosure have extensively conducted studies for achieving the above-mentioned object. As a result, it has been found that by providing a predetermined barrier layer protective film on a surface of a barrier layer of an exterior material in an all-solid-state battery, deterioration of the barrier layer of the exterior material is effectively suppressed even when the all-solid-state battery is constrained in a high pressure state.

The present disclosure has been completed by further conducting studies based on the above-mentioned findings. That is, the present disclosure provides an invention of an aspect as described below:

The all-solid-state battery has a battery element contained in a packaging formed of an exterior material, the battery element comprising at least a unit cell including: a positive active material layer; a negative active material layer; and a solid electrolyte layer laminated between the positive active material layer and the negative electrode active material layer, the exterior material including a laminate including at least a barrier layer, a barrier layer protective film formed on the surface of the barrier layer, and a heat-sealable resin layer in this order.

Advantages of the Invention

According to the present disclosure, it is possible to provide an all-solid-state battery in which deterioration of a barrier layer of an exterior material is effectively suppressed even when the all-solid-state battery is constrained in a high-pressure state. According to the present disclosure, it is also possible to provide a method for manufacturing the all-solid-state battery can.

EMBODIMENTS OF THE INVENTION

Figure 1:
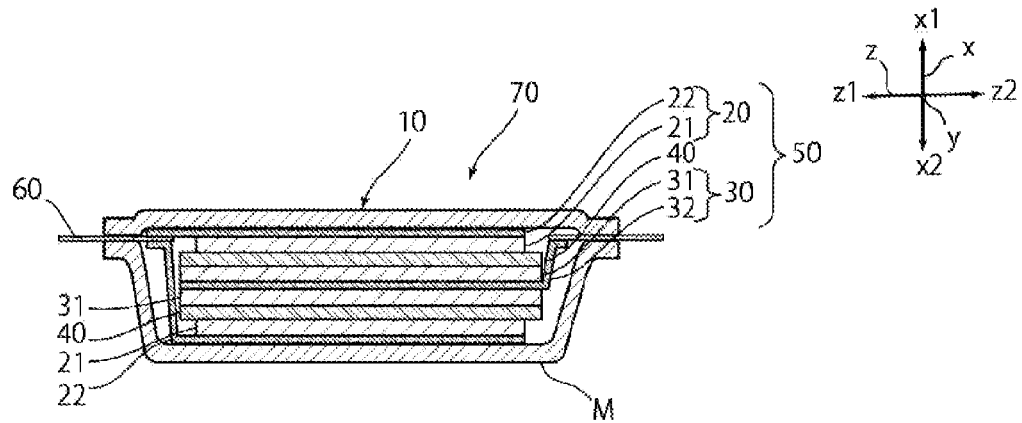
FIG. 1 is a schematic diagram showing an example of a cross-sectional structure of an all-solid-state battery to which an exterior material in the present disclosure is applied.

The exterior material according to the present disclosure is an all-solid-state battery in which a battery element is housed in a packaging formed of an exterior material, the battery element including at least a unit cell including: a positive active material layer; a negative active material layer; and a solid electrolyte layer laminated between the positive active material layer and the negative active material layer. The exterior material includes a laminate having at least a barrier layer, a barrier layer protective film formed on the surface of the barrier layer, and a heat-sealable resin layer in this order. According to the exterior material in the present disclosure, deterioration of the barrier layer of the exterior material is effectively suppressed even when the all-solid-state battery is constrained in a high pressure state because the exterior material has the above-mentioned configuration.

Hereinafter, the exterior material of the present disclosure will be described in detail. In this specification, a numerical range indicated by the term "A to B" means "A or more" and "B or less". For example, the expression of "2 to 15 mm" means 2 mm or more and 15 mm or less.

1. Laminated Structure of Exterior Material

As shown in, for example, FIG. 4 to FIG. 7, an exterior material 10 according to the present disclosure includes a laminate including at least a barrier layer 3, a barrier layer protective film 3a formed on a surface of barrier layer 3, and a heat-sealable resin layer 4 in this order. In the exterior material 10, the barrier layer 3 is on the outer layer side, and the heat-sealable resin layer 4 is on the inner layer side. In construction of the all-solid-state battery using the exterior material 10 and battery elements, the battery elements are put in a space formed by heat-sealing the peripheral portions of the first heat-sealable resin layers 4 of the exterior material 10 which face each other.

Figure 5:
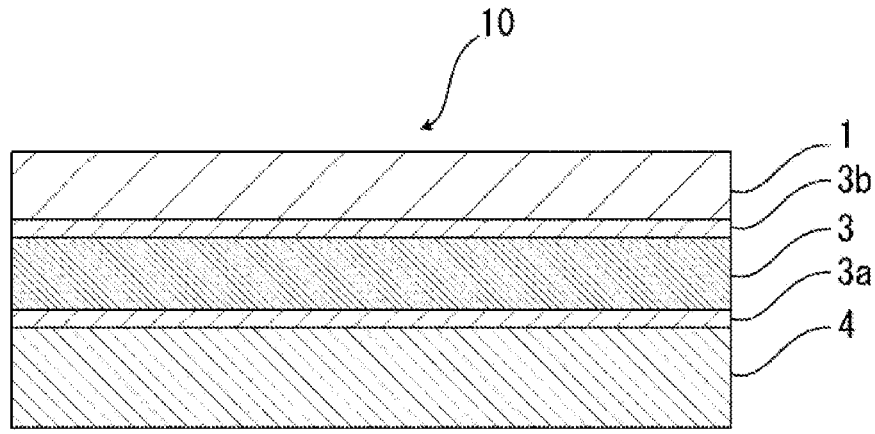
FIG. 5 is a schematic sectional view showing an example of a laminated structure of the exterior material in the present disclosure.
Figure 6:
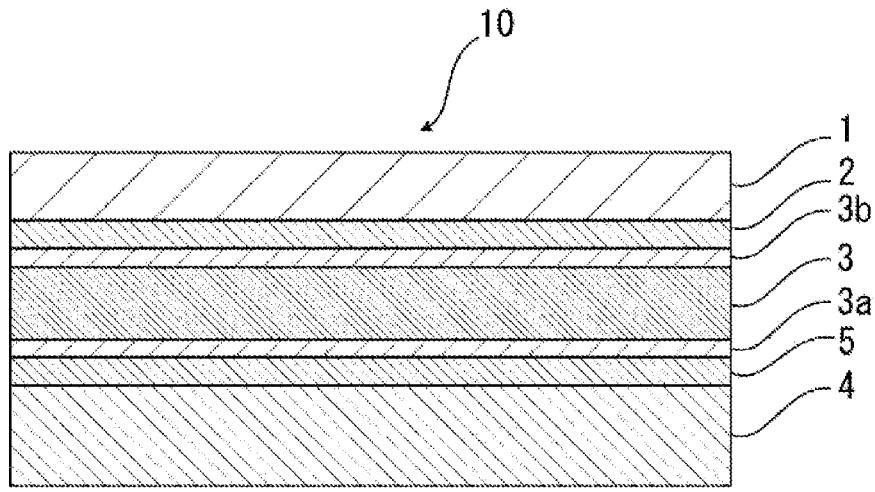
FIG. 6 is a schematic sectional view showing an example of a laminated structure of the exterior material in the present disclosure.
Figure 7:
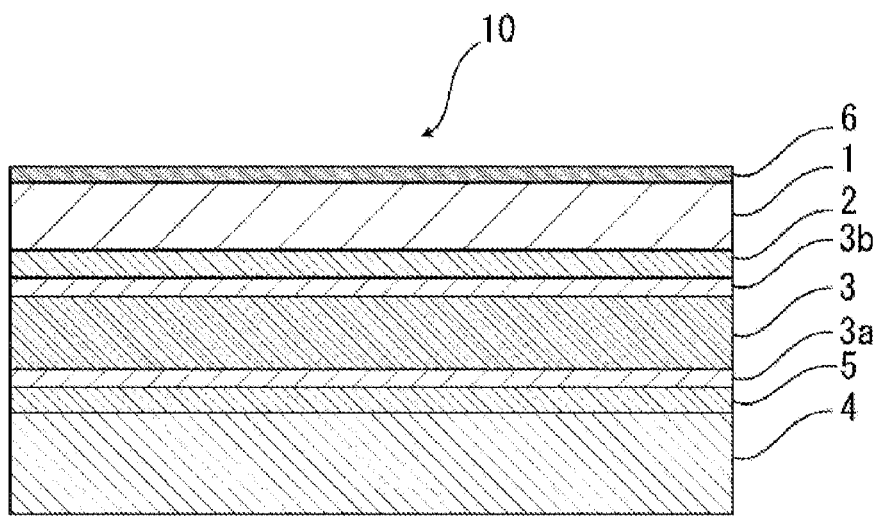
FIG. 7 is a schematic sectional view showing an example of a laminated structure of the exterior material in the present disclosure.

A barrier layer protective film 3a is provided on a surface of the barrier layer 3 on the heat-sealable resin layer 4 side. The barrier layer protective film 3a contains chromium. FIG. 4 to FIG. 7 are schematic diagrams where the exterior material 10 of the present disclosure includes the barrier layer protective film 3a on a surface of the barrier layer 3 on the heat-sealable resin layer 4 side. In addition, FIG. 5 to FIG. 7 are schematic diagrams where the exterior material 10 includes barrier layer protective films 3a and 3b on both surfaces of the barrier layer 3, respectively. As described later, the exterior material 10 may include the barrier layer protective film 3a only on a surface of the barrier layer 3 on the heat-sealable resin layer 4 side, or may include the barrier layer protective films 3a and 3b on both surfaces of the barrier layer 3, respectively.

As shown in the schematic diagrams of FIG. 4 to FIG. 7, the exterior material 10 may have a base material layer 1 outside the barrier layer 3. As shown in FIG. 6 and FIG. 7, an adhesive agent layer 2 may be provided between the base material layer 1 and the barrier layer 3 (between base material layer 1 and barrier layer protective film 3b when the barrier layer protective film 3b is present) if necessary for the purpose of, for example, improving bondability between these layers. As shown in, for example, FIG. 6 and FIG. 7, an adhesive layer 5 may be provided between the barrier layer protective film 3a and the heat-sealable resin layer 4 if necessary for the purpose of, for example, improving bondability between these layers. As shown in FIG. 7, a surface coating layer 6 or the like may be provided outside the barrier layer 3 (on a side opposite to the heat-sealable resin layer 4 side, and outside the base material layer 1 when the base material layer 1 is present) if necessary.

Details of layers forming the exterior material 10 will be described in detail in the section "3. Layers forming exterior material".

The thickness of the laminate forming the exterior material 10 is not particularly limited, and is preferably about 10,000 μm or less, about 8,000 μm or less or about 5,000 μm or less from the viewpoint of cost reduction, improvement of the energy density and the like, and preferably about 100 μm or more, about 150 μm or more, or about 200 μm or more from the viewpoint of maintaining the function of the exterior material 10 for an all-solid-state battery, which is protection of battery elements. The thickness of the laminate is preferably in the range of, for example, about 100 to 10,000 μm, about 100 to 8,000 μm, about 100 to 5,000 μm, about 150 to 10,000 μm, about 150 to 8,000 μm, about 150 to 5,000 μm, about 200 to 10,000 μm, 200 to 8,000 μm or about 200 to 5,000 μm, especially preferably about 100 to 500 μm.

2. All-Solid-State Battery

The all-solid-state battery 70 of the present disclosure is not particularly limited as long as a specific exterior material 10 is used. That is, the constituents (e.g. electrodes, a solid electrolyte and a terminal) other than the exterior material 10, etc. are not particularly limited as long as they are applied to an all-solid-state battery, and may be those used in a known all-solid-state battery. Hereinafter, the all-solid-state battery 70 of the present disclosure will be described in detail.

Figure 2:
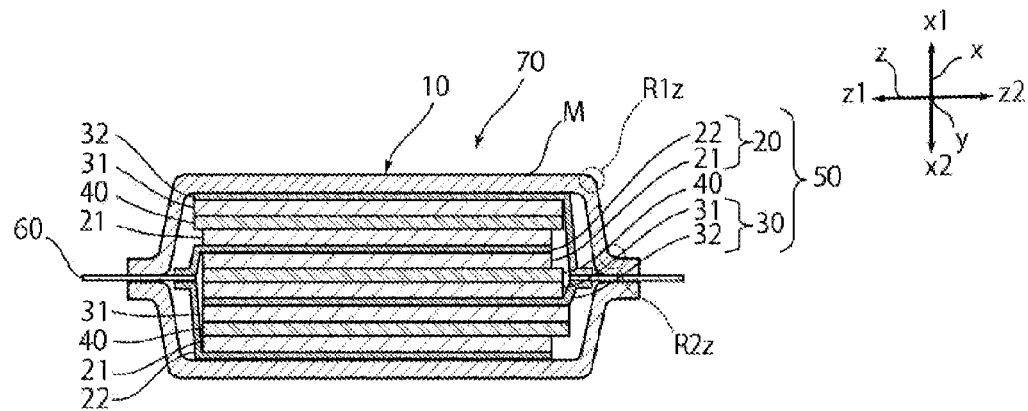
FIG. 2 is a schematic diagram showing an example of a cross-sectional structure of an all-solid-state battery to which the exterior material in the present disclosure is applied.
Figure 3:
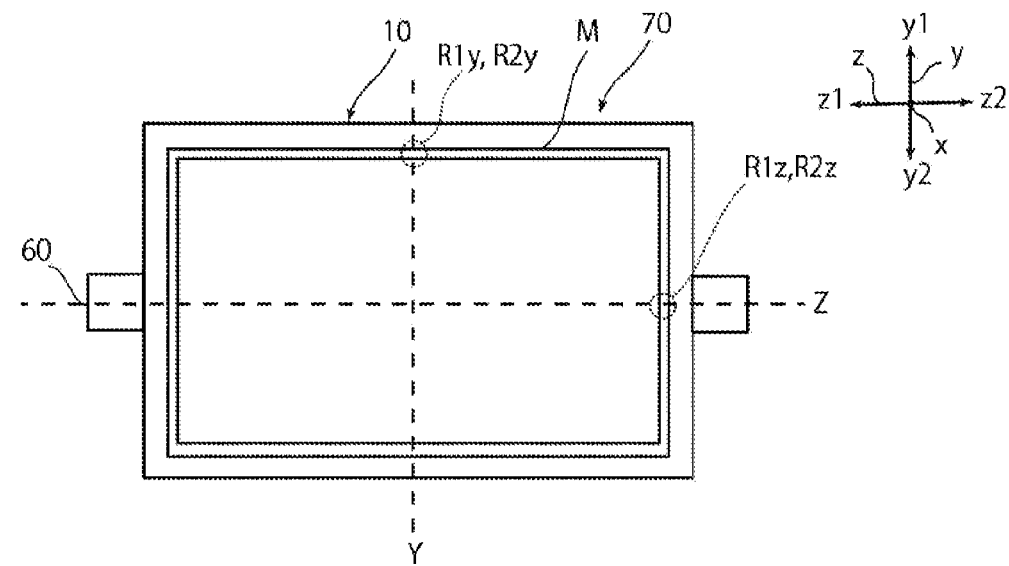
FIG. 3 is a schematic plan view of an example of an all-solid-state battery to which the exterior material in the present disclosure is applied.
Figure 4:
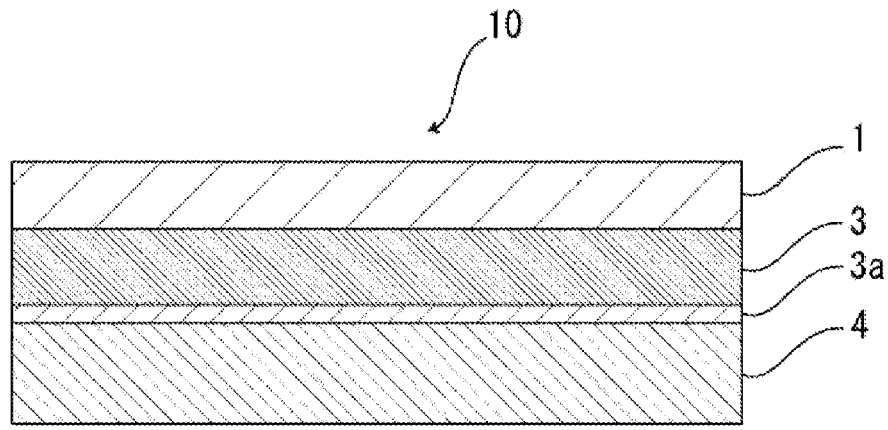
FIG. 4 is a schematic sectional view showing an example of a laminated structure of the exterior material in the present disclosure.

As shown in the schematic diagrams of FIG. 1 to FIG. 3, the all-solid-state battery 70 of the present disclosure is one in which a battery element including at least a unit cell 50 including a negative active material layer 21, a positive active material layer 31, and a solid electrolyte layer 40 laminated between the negative active material layer 21 and the positive active material layer 31 is housed in a packaging formed from an exterior material 10. More specifically, the negative active material layer 21 is laminated on the negative electrode current collector 22 to form the negative electrode layer 20, and the positive active material layer 31 is laminated on the positive electrode current collector 32 to form the positive electrode layer 30. The negative electrode current collector 22 and the positive electrode current collector 32 are each bonded to a terminal 60 exposed to the outside and electrically connected to the external environment. The solid electrolyte layer 40 is laminated between the negative electrode layer 20 and the positive electrode layer 30, and the negative electrode layer 20, the positive electrode layer 30 and the solid electrolyte layer 40 form the unit cell 50. The battery element of the all-solid-state battery 70 may include only one unit cell 50 or may include a plurality of unit cells 50. FIG. 1 shows the all-solid-state battery 70 including two unit cells 50 as a battery element, and FIG. 2 shows the all-solid-state battery 70 in which three unit cells 50 are laminated to form a battery element.

In the all-solid-state battery 70, the battery element is covered such that a flange portion (region where heat-sealable resin layers are in contact with each other) can be formed on the periphery edge of the battery element while the terminal 60 connected to each of the negative electrode layer 20 and the positive electrode layer 30 protrudes to the outside, and the heat-sealable resin layers at the flange portion are heat-sealed to each other, thereby providing an all-solid-state battery including an exterior material. When a battery element is housed in a packaging formed from the exterior material 10, the packaging is formed in such a manner that the heat-sealable resin portion of the exterior material 10 is on the inner side (a surface contacting the battery element).

As described above, the all-solid-state battery of the present disclosure to which the exterior material 10 is applied is not particularly limited as long as a specific exterior material 10 is used, and the same applies to the all-solid-state battery 70 of the present disclosure. Hereinafter, materials of members forming the battery element of the all-solid-state battery 70, etc. will be exemplified.

In the battery element of the all-solid-state battery 70, at least the negative electrode layer 20, the positive electrode layer 30 and the solid electrolyte layer 40 form a unit cell 50. The negative electrode layer 20 has a structure in which the negative active material layer 21 is laminated on the negative electrode current collector 22. The positive electrode layer 30 has a structure in which the positive active material layer 31 is laminated on the positive electrode current collector 32. The negative electrode current collector 22 and the positive electrode current collector 32 are each bonded to a terminal 60 exposed to the outside and electrically connected to the external environment.

[Positive Active Material Layer 31]

The positive active material layer 31 is a layer containing at least a positive active material. The positive active material layer 31 may further contain a solid electrolyte material, a conductive material, a binding material and the like if necessary in addition to the positive active material.

The positive active material is not particularly limited, and examples thereof include oxide active materials and sulfide active materials. When the all-solid-state battery is an all-solid-state lithium battery, examples of the oxide active material used as the positive active material include rock salt layered active materials such as $LiCoO_2$, $LiMnO_2$, $LiNiO_2$, $LiVO_2$ and $LiNi_{1/3}Co_{1/3}Mn_{1/3}O_2$, spinel type active materials such as $LiMn_2O_4$ and $Li(Ni_{0.5}Mn_{1.5})O_4$, olivine type active materials such as $LiFePO_4$ and $LiMnPO_4$, and Si-containing active materials such as $Li_2FeSiO_4$ and $Li_2MnSiO_4$. In addition, examples of the sulfide active material used as the positive active material of the all-solid-state lithium battery include copper shredder, iron sulfide, cobalt sulfide, and nickel sulfide.

The shape of the positive active material is not particularly limited, and examples thereof include a particle shape. Preferably, the mean particle size ($D_{50}$) of the positive active material is, for example, about 0.1 to 50 μm. The content of the positive active material in the positive active material layer 31 is preferably about 10 to 99 mass %, more preferably about 20 to 90 mass %.

Preferably, the positive active material layer 31 further contains a solid electrolyte material. This enables improvement of ion conductivity in the positive active material layer 31. The solid electrolyte material contained in the positive active material layer 31 is the same as the solid electrolyte material exemplified for the solid electrolyte layer 40 described later. The content of the solid electrolyte material in the positive active material layer is preferably about 1 to 90 mass %, more preferably about 10 to 80 mass %.

The positive active material layer 31 may further contain a conductive material. Addition of a conductive material enables improvement of the electron conductivity of the positive active material layer. Examples of the conductive material include acetylene black, Ketjen black and carbon fiber. The positive active material layer may further contain a binding material. Examples of the binding material include fluorine-containing binding materials such as polytetrafluoroethylene (PTFE) and polyvinylidene fluoride (PVDF).

The thickness of the positive active material layer 31 is appropriately set according to the size and the like of the all-solid-state battery, and is preferably about 0.1 to 1,000 μm.

[Positive Electrode Current Collector 32]

Examples of the material forming the positive electrode current collector 32 include stainless steel (SUS), aluminum, nickel, iron, titanium and carbon.

The thickness of the positive electrode current collector 32 is appropriately set according to the size and the like of the all-solid-state battery, and is preferably about 10 to 1,000 μm.

[Negative Active Material Layer 21]

The negative active material layer 21 is a layer containing at least a negative active material. The negative active material layer 21 may contain a solid electrolyte material, a conductive material, a binding material and the like if necessary in addition to the negative active material.

The negative active material is not particularly limited, and examples thereof include carbon active materials, metal active materials and oxide active materials. Examples of the carbon active material include graphite such as mesocarbon microbeads (MCMB) and highly oriented graphite (HOPG), and amorphous carbon such as hard carbon and soft carbon.

Examples of the metal active material include In, Al, Si and Sn. Examples of the oxide active material include $Nb_2O_5$, $Li_4Ti_5O_{12}$ and SiO.

The shape of the negative active material is not particularly limited, and examples thereof include a particle shape and a film shape. Preferably, the mean particle size ($D_{50}$) of the negative active material is, for example, about 0.1 to 50 µm. The content of the negative active material in the negative active material layer 21 is, for example, about 10 to 99 mass %, more preferably about 20 to 90 mass %.

Preferably, the negative active material layer 21 further contains a solid electrolyte material. This enables improvement of ion conductivity in the negative active material layer 21. The solid electrolyte material contained in the negative active material layer 21 is the same as the solid electrolyte material exemplified for the solid electrolyte layer 40 described later. The content of the solid electrolyte material in the negative active material layer 21 is preferably about 1 to 90 mass %, more preferably about 10 to 80 mass %.

The negative active material layer 21 may further contain a conductive material. The negative active material layer 21 may further contain a binding material. The conductive material and the binding material are the same as those exemplified for the positive active material layer 31 described above.

The thickness of the negative active material layer 21 is appropriately set according to the size and the like of the all-solid-state battery, and is preferably about 0.1 to 1,000 µm.

[Negative Electrode Current Collector 22]

Examples of the material forming the negative electrode current collector 22 include stainless steel (SUS), copper, nickel and carbon.

The thickness of the negative electrode current collector 22 is appropriately set according to the size and the like of the all-solid-state battery, and is preferably about 10 to 1,000 µm.

[Solid Electrolyte Layer 40]

The solid electrolyte layer 40 is a layer containing a solid electrolyte material. Examples of the solid electrolyte material include sulfide solid electrolyte materials and oxide solid electrolyte materials.

Sulfide solid electrolyte materials are preferable because many of the sulfide solid electrolyte materials have higher ion conductivity over oxide solid electrolyte materials, and oxide solid electrolyte materials are preferable because they have higher chemical stability over sulfide solid electrolyte materials. In the all-solid-state battery of the present disclosure, the exterior material 10 having the barrier layer protective film 3a formed on the surface of the barrier layer 3 is used, and therefore, deterioration of the barrier layer 3 of the exterior material 10 is effectively suppressed even when a solid electrolyte containing, for example, a sulfide solid electrolyte material or an oxide solid electrolyte material is used.

Specific examples of the oxide solid electrolyte material include compounds having a NASICON-type structure. Examples of the compound having a NASICON-type structure include a compounds represented by the general formula $Li_{1+x}Al_xGe_{2-x}(PO_4)_3$ ($0 \leq x \leq 2$). In particular, the compound is preferably $Li_{1.5}Al_{0.5}Ge_{1.5}(PO_4)_3$. Examples of the compound having a NASICON-type structure include a compounds represented by the general formula $Li_{1+x}AlxTi_{2-x}(PO_4)_3$ ($0 \leq x \leq 2$). In particular, the compound is preferably $Li_{1.5}Al_{0.5}Ti_{1.5}(PO_4)_3$. Examples of the oxide solid electrolyte material used for the all-solid lithium secondary battery include LiLaTiO (e.g. $Li_{0.34}La_{0.51}TiO_3$) and LiPON (e.g. $Li_{2.9}PO_{3.3}N_{0.46}$) and LiLaZrO (e.g. $Li_7La_3Zr_2O_{12}$).

Specific examples of the sulfide solid electrolyte material include $Li_2S$—$P_2S_5$, $Li_2S$—$P_2S_5$—LiI, $Li_2S$—$P_2S_5$—$Li_2O$, $Li_2S$—$P_2S_5$—$Li_2O$-LiL $Li_2S$—$SiS_2$, $Li_2S$—$SiS_2$—LiL $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2SP_2S_5$-ZmSn (where each of m and n is a positive number, and Z is any of Ge, Zn and Ga), $Li_2S$—$GeS_2$, $Li_2S$—$SiS_2$—$Li_3PO_4$ and $Li_2S$—$SiS_2$—$Li_xMO_y$, (where each of x and y is a positive number, and M is any one of P, Si, Ge, B, Al, Ga and In). Note that the above description of "$Li_2S$—$P_2S_5$" means a sulfide solid electrolyte material obtained using a raw material composition containing $Li_2S$ and $P_2S_5$, and the same applies to other descriptions. The sulfide solid electrolyte material may be sulfide glass or crystallized sulfide glass.

The content of the solid electrolyte material in the solid electrolyte layer 40 is not particularly limited, and is preferably 60 mass % or more, more preferably 70 mass % or more, still more preferably 80 mass % or more. The solid electrolyte layer may contain a binding material or may include only a solid electrolyte material.

The thickness of the solid electrolyte layer 40 is appropriately set according to the size and the like of the all-solid-state battery, and is preferably about 0.1 to 1,000 µm, more preferably about 0.1 to 300 µm.

The all-solid-state battery 70 of the present disclosure can be suitably used in an environment of being constrained under high pressure from the outside. From the viewpoint of suitably suppressing delamination between the solid electrolyte and the negative active material layer (and between the solid electrolyte and the positive active material layer), the pressure for constraining the all-solid-state battery 70 from the outside is preferably about 0.1 MPa or more, more preferably 5 MPa or more, still more preferably about 1 MPa or more, and preferably about 100 MPa or less, more preferably about 30 MPa or less, and the pressure is preferably in the range of about 0.1 to 100 MPa, about 0.1 to 70 MPa, about 5 to 100 MPa, about 5 to 70 MPa, about 10 to 100 MPa, or about 1 to 30 MPa. Examples of the method for constraining the all-solid-state battery 70 under high pressure from the outside include a method in which the all-solid-state battery is sandwiched between metal plates or the like, and fixed in a state of being pressed at high pressure (e.g. tightened with a vise or the like).

Examples of the method for constraining the all-solid-state battery 70 under high pressure from the outside include a method in which the all-solid-state battery is sandwiched between metal plates or the like, and fixed in a state of being pressed at high pressure (e.g. tightened with a vise or the like); and methods such as pressurization with gas.

From the same viewpoint, the temperature at which the all-solid-state battery 70 is constrained from the outside is preferably 20° C. or higher, more preferably 40° C. or higher, and preferably 200° C. or lower, more preferably 150° C. or lower, and is preferably in the range of about 20 to 150° C.

The shape of the all-solid-state battery 70 of the present disclosure is not particularly limited, and is preferably a rectangular shape in plan view as shown in, for example, the schematic diagram of FIG. 3. Further, the ratio of the length of the first side of the all-solid-state battery 70 having a rectangular shape in plan view to the length of the second side in a direction perpendicular to the first side (length of first side: length of second side) is preferably about 1:1 to 1:5, more preferably about 1:1 to 1:3. If the length of the second side is excessively large relative to the first side, the R value (curvature radius) of a ridgeline (first curved portion as described later) along the second side of a molded part M tends to be excessively large because the second side is difficult to fix to a mold at the time when the exterior material 10 is molded to form the later-described molded part M.

It is preferable that in the all-solid-state battery 70 of the present disclosure, the battery element is housed in the molded part M having a rectangular shape in plan view, which is formed such that the exterior material 10 protrudes from the heat-sealable resin layer 4 side to the barrier layer 3 side as shown in the schematic diagrams of FIG. 1 to FIG. 3. FIG. 1 is a diagram in which a molded part M is formed on one side of the all-solid-state battery 70. FIG. 2 is a diagram in which a molded part M is formed on one side of the all-solid-state battery 70.

In the present disclosure, it is preferable that when viewed in a plan view from the barrier layer 3 side, the all-solid-state battery 70 includes a first curved portion R1 (see R1z in FIG. 2) and a second curved portion R2 (see R2z in FIG. 2) in this order from the center part toward the end part of the exterior material 10 is on a thickness-direction cross-section of the exterior material 10 on a straight line which is parallel to two sides parallel to each other (two sides parallel to the y direction or two sides parallel to the z direction in FIG. 1 to FIG. 3) in the rectangular molded part M and which extends through the middle between the two parallel sides (see broken line Y in the y direction and broken line Z in the z direction in FIG. 3), and the R value (curvature radius) in the first curved portion R1 is 1 mm or more. When the R value (curvature radius) is 1 mm or more, a force with which the exterior material 10 is stretched is not excessively large at a corner (corner part) of the rectangular molded part M, and thus generation of pinholes and the like in the barrier layer 3 before reaching a predetermined molding depth is suppressed. When the exterior material 10 is molded using a mold, the molded part M including the first curved portion R1 and the second curved portion R2 is formed such that the exterior material 10 protrudes from the heat-sealable resin layer 4 side to the barrier layer 3 side. In the molded part M, the first curved part R1 is located to protrude to the outside of the all-solid-state battery.

In the schematic view of FIG. 3, a sectional view on broken line Z corresponds to the schematic diagram of FIG. 2, and the molded part M includes the first curved portion R1z and the second curved portion R2z in this order from the center part to the end part of the exterior material 10. In the schematic view of FIG. 3, the molded part M includes the first curved portion R1y and the second curved portion R2y in this order from the center part to the end part of the exterior material 10 on the cross-section on broken line Y. The expression of first curved portion R1z means a first curved portion in the z direction. Similarly, the expression of second curved portion R2z means a second curved portion in the z direction, the expression of first curved portion R1y means a first curved portion in the y direction, and the expression of second curved portion R2y means a second curved portion in the y direction. For the first curved portion R1y, the R value (curvature radius) is preferably 1 mm or more because when the R value (curvature radius) is 1 mm or more, a force with which the exterior material 10 is stretched is not excessively large at a corner (corner part) of the rectangular molded part M, and thus generation of pinholes and the like in the barrier layer 3 before reaching a predetermined molding depth is suppressed as in the case of the R value in the first curved portion R1.

In the present disclosure, each of the R values (curvature radii) in each of the first curved portion R1 and the second curved portion R2 is a R value (curvature radius) on a surface of the exterior material 10 on the barrier layer 3 side (i.e. a portion which is on the outer surface side of the exterior material 10 and which is surrounded by, for example, the broken line in FIG. 2).

In the all-solid-state battery of the present disclosure, it is preferable that the first side parallel to the y direction of the all-solid-state battery having a rectangular shape in plan view is a short side, the second side parallel to the z direction is a long side, and the R value (curvature radius) in the first curved portion R1z along the short side parallel to the y direction in which the terminal of the all-solid-state battery having a rectangular shape in plan view is installed is larger than the R value (curvature radius) in the first curved portion R1y along the long side parallel to the z direction, in, for example, FIG. 3, for the purpose of minimizing the dead space inside the battery and increasing the volume energy density.

3. Each Layer Forming Exterior Material

The exterior material 10 according to the present disclosure includes a laminate including at least the barrier layer 3, the barrier layer protective film 3a formed on a surface of barrier layer 3, and the heat-sealable resin layer 4 in this order. Hereinafter, each layer forming the exterior material 10 will be described in detail.

[Base Material Layer 1]

In the present disclosure, the base material layer 1 is a layer provided outside the barrier layer 3 (outer the barrier layer protective film 3b when the barrier layer protective film 3b is present) if necessary for the purpose of, for example, exhibiting a function as a base material of the exterior material 10. The base material layer 1 is located on the outer layer side of the exterior material 10.

The material that forms the base material layer 1 is not particularly limited as long as it has a function as a base material, i.e. at least insulation quality. The base material layer 1 can be formed using, for example, a resin, and the resin may contain additives described later.

When the base material layer 1 is formed of a resin, the base material layer 1 may be, for example, a resin film formed of a resin, or may be formed by applying a resin. The resin film may be an unstretched film or a stretched film. Examples of the stretched film include uniaxially stretched films and biaxially stretched films, and biaxially stretched films are preferable. Examples of the stretching method for forming a biaxially stretched film include a sequential biaxial stretching method, an inflation method, and a simultaneous biaxial stretching method. Examples of the method for applying a resin include a roll coating method, a gravure coating method and an extrusion coating method.

Examples of the resin that forms the base material layer 1 include resins such as polyester, polyamide, polyolefin, epoxy resin, acrylic resin, fluororesin, polyurethane, silicone resin and phenol resin, and modified products of these resins. The resin that forms the base material layer 1 may be a copolymer of these resins or a modified product of the copolymer. Further, a mixture of these resins may be used.

Of these resins, polyester and polyamide are preferable as resins that form the base material layer 1.

Specific examples of the polyester resin include polyethylene terephthalate, polybutylene terephthalate, polyethylene naphthalate, polybutylene naphthalate, polyethylene isophthalate and copolyester. Examples of the copolyester include copolyesters having ethylene terephthalate as a main repeating unit. Specific examples thereof include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene (terephthalate/decane dicarboxylate). These polyesters may be used alone, or may be used in combination of two or more thereof.

Specific examples of the polyamide include polyamides such as aliphatic polyamides such as nylon 6, nylon 66, nylon 610, nylon 12, nylon 46, and copolymers of nylon 6 and nylon 66; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polyamide MXD6 (polymethaxylylene adipamide); cycloaliphatic polyamides such as polyamide PACM6 (polybis(4-aminocyclohexyl)methaneadipamide; polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof.

The base material layer 1 contains preferably at least one of a polyester film, a polyamide film and a polyolefin film, preferably at least one of a stretched polyester film, a stretched polyamide film and a stretched polyolefin film, still more preferably at least one of a stretched polyethylene terephthalate film, a stretched polybutylene terephthalate film, a stretched nylon film and a stretched polypropylene film, even more preferably at least one of a biaxially stretched polyethylene terephthalate film, a biaxially stretched polybutylene terephthalate film, a biaxially stretched nylon film, and a biaxially stretched polypropylene film.

The base material layer 1 may be a single layer, or may include two or more layers. When the base material layer 1 includes two or more layers, the base material layer 1 may be a laminate obtained by laminating resin films with an adhesive or the like, or a resin film laminate obtained by co-extruding resins to form two or more layers. The resin film laminate obtained by co-extruding resins to form two or more layers may be used as the base material layer 1 in an unstretched state, or may be uniaxially stretched or biaxially stretched and used as the base material layer 1.

Specific examples of the resin film laminate with two or more layers in the base material layer 1 include laminates of a polyester film and a nylon film, nylon film laminates with two or more layers, and polyester film laminates with two or more layers. Laminates of a stretched nylon film and a stretched polyester film, stretched nylon film laminates with two or more layers, and stretched polyester film laminates with two or more layers are preferable. For example, when the base material layer 1 is a resin film laminate with two layers, the base material layer 1 is preferably a laminate of a polyester resin film and a polyester resin film, a laminate of a polyamide resin film and a polyamide resin film, or a laminate of a polyester resin film and a polyamide resin film, more preferably a laminate of a polyethylene terephthalate film and a polyethylene terephthalate film, a laminate of a nylon film and a nylon film, or a laminate of a polyethylene terephthalate film and a nylon film.

When the base material layer 1 is a resin film laminate with two or more layers, the two or more resin films may be laminated with an adhesive interposed therebetween. Specific examples of the preferred adhesive include the same adhesives as those exemplified for the adhesive agent layer 2 described later. The method for laminating a resin film having two or more layers is not particularly limited, and a known method can be employed. Examples thereof include a dry lamination method, a sand lamination method, an extrusion lamination method and a thermal lamination method, and a dry lamination method is preferable. When the resin film is laminated by a dry lamination method, it is preferable to use a polyurethane adhesive as the adhesive layer. Here, the thickness of the adhesive is, for example, about 2 to 5 μm. In addition, the lamination may be performed with an anchor coat layer formed on the resin film. Examples of the anchor coat layer include the same adhesives as those exemplified for the adhesive agent layer 2 described later. Here, the thickness of the anchor coat layer is, for example, about 0.01 to 1.0 μm.

Additives such as a lubricant, a flame retardant, an antiblocking agent, an antioxidant, a light stabilizer, a tackifier and an antistatic agent may be present on the surface of the base material layer 1 and/or inside the base material layer 1. The additives may be used alone, or may be used in combination of two or more thereof.

In the present disclosure, it is preferable that a lubricant is present on the surface of the base material layer 1 from the viewpoint of enhancing the moldability of the exterior material 10. The lubricant is not particularly limited, and is preferably an amide-based lubricant. Specific examples of the amide-based lubricant include saturated fatty acid amides, unsaturated fatty acid amides, substituted amides, methylol amides, saturated fatty acid bisamides, unsaturated fatty acid bisamides, fatty acid ester amides an aromatic bisamides. Specific examples of the saturated fatty acid amide include lauric acid amide, palmitic acid amide, stearic acid amide, behenic acid amide, and hydroxystearic acid amide. Specific examples of unsaturated fatty acid amide include oleic acid amide and erucic acid amide. Specific examples of the substituted amide include N-oleylpalmitic acid amide, N-stearyl stearic acid amide, N-stearyl oleic acid amide, N-oleyl stearic acid amide and N-stearyl erucic acid amide. Specific examples of the methylolamide include methylolstearic acid amide. Specific examples of the saturated fatty acid bisamide include methylenebisstearic acid amide, ethylenebiscapric acid amide, ethylenebislauric acid amide, ethylenebisstearic acid amide, ethylenebishydroxystearic acid amide, ethylenebisbehenic acid amide, hexamethylenebisstearic acid amide, hexamethylenehydroxystearic acid amide, N,N'-distearyl adipic acid amide and N,N'-distearyl sebacic acid amide. Specific examples of the unsaturated fatty acid bisamide include ethylenebisoleic acid amide, ethylenebiserucic acid amide, hexamethylenebisoleic acid amide, N,N'-dioleyladipic acid amide and N,N'-dioleylsebacic acid amide. Specific examples of the fatty acid ester amide include stearoamideethyl stearate. Specific examples of the aromatic bisamide include m-xylylenebisstearic acid amide, m-xylylenebishydroxystearic acid amide and N,N'-distearylisophthalic acid amide. The lubricants may be used alone, or may be used in combination of two or more thereof.

When the lubricant is present on the surface of the base material layer 1, the amount of the lubricant present is not particularly limited, and is preferably about 3 mg/m² or more, more preferably about 4 to 15 mg/m², still more preferably about 5 to 14 mg/m².

The lubricant present on the surface of the base material layer 1 may be one obtained by exuding the lubricant contained in the resin forming the base material layer 1, or one obtained by applying the lubricant to the surface of the base material layer 1.

The thickness of the base material layer 1 is not particularly limited as long as a function as a base material is performed, and the thickness of the base material layer 1 is, for example, about 3 to 50 μm, preferably about 10 to 35 μm. When the base material layer 1 is a resin film laminate with two or more layers, the thickness of the resin film forming each layer is preferably about 2 to 25 μm.

[Adhesive Agent Layer 2]

In the exterior material 10, the adhesive agent layer 2 is a layer provided between the base material layer 1 and the barrier layer 3 if necessary for the purpose of improving bondability between these layers (bondability between the base material layer 1 and the barrier layer protective film 3b when the barrier layer protective film 3b is present).

The adhesive agent layer 2 is formed from an adhesive capable of bonding the base material layer 1 and the barrier layer 3 (or barrier layer protective film 3b). The adhesive used for forming the adhesive agent layer 2 is not limited, and may be any of a chemical reaction type, a solvent volatilization type, a heat melting type, a heat pressing type, and the like. The adhesive agent may be a two-liquid curable adhesive (two-liquid adhesive), a one-liquid curable adhesive (one-liquid adhesive), or a resin that does not involve curing reaction. The adhesive agent layer 2 may be a single layer or a multi-layer.

Specific examples of the adhesive component contained in the adhesive include polyester resins such as polyethylene terephthalate, polybutylene terephthalate, polyethylene naphthalate, polybutylene naphthalate, polyethylene isophthalate and copolyester; polyether; polyurethane; epoxy resins; phenol resins; polyamides such as nylon 6, nylon 66, nylon 12 and copolymerized polyamide; polyolefin-based resins such as polyolefins, cyclic polyolefins, acid-modified polyolefins and acid-modified cyclic polyolefins; cellulose; (meth)acrylic resins; polyimide; polycarbonate; amino resins such as urea resins and melamine resins; rubbers such as chloroprene rubber, nitrile rubber and styrene-butadiene rubber; and silicone resins. These adhesive components may be used alone, or may be used in combination of two or more thereof. Of these adhesive components, polyurethane-based adhesives are preferable. In addition, the adhesive strength of these resins used as adhesive components can be increased by using an appropriate curing agent in combination. As the curing agent, appropriate one is selected from polyisocyanate, a polyfunctional epoxy resin, an oxazoline group-containing polymer, a polyamine resin, an acid anhydride and the like according to the functional group of the adhesive component.

Examples of the polyurethane adhesive include polyurethane adhesives containing a main agent containing a polyol compound and a curing agent containing an isocyanate compound. The polyurethane adhesive is preferably a two-liquid curable polyurethane adhesive having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound.

Other components may be added to the adhesive agent layer 2 as long as bondability is not inhibited, and the adhesive agent layer 2 may contain a colorant, a thermoplastic elastomer, a tackifier, a filler and the like. When the adhesive agent layer 2 contains a colorant, the exterior material 10 can be colored. As the colorant, known colorants such as pigments and dyes can be used. The colorants may be used alone, or may be used in combination of two or more thereof.

The type of pigment is not particularly limited as long as the bondability of the adhesive agent layer 2 is not impaired. Examples of the organic pigment include azo-based pigments, phthalocyanine-based pigments, quinacridone-based pigments, anthraquinone-based pigments, dioxazine-based pigments, indigothioindigo-based pigments, perinone-perylene-based pigments, isoindolenine-based pigments and benzimidazolone-based pigments. Examples of the inorganic pigment include carbon black-based pigments, titanium oxide-based pigments, cadmium-based pigments, lead-based pigments, chromium-based pigments and iron-based pigments, and also fine powder of mica (mica) and fish scale foil.

Of the colorants, carbon black is preferable for the purpose of, for example, blackening the appearance of the exterior material 10.

The average particle diameter of the pigment is not particularly limited, and is, for example, about 0.05 to 5 μm, preferably about 0.08 to 2 μm. The average particle size of the pigment is a median diameter measured by a laser diffraction/scattering particle size distribution measuring apparatus.

The content of the pigment in the adhesive agent layer 2 is not particularly limited as long as the exterior material 10 is colored, and the content is, for example, about 5 to 60 mass %, preferably 10 to 40 mass %.

The thickness of the adhesive agent layer 2 is not particularly limited as long as the base material layer 1 and the barrier layer 3 can be bonded to each other, and for example, the thickness is about 1 μm or more, or about 2 μm or more, and about 10 μm or less, or about 5 μm or less, and is preferably in the range of about 1 to 10 μm, about 1 to 5 μm, about 2 to 10 μm, or about 2 to 5 μm.

[Colored Layer]

The colored layer is a layer provided between the base material layer 1 and the barrier layer 3 (or the barrier layer protective film 3b) if necessary (not shown). When the adhesive agent layer 2 is present, the colored layer may be provided between the base material layer 1 and the adhesive agent layer 2 or between the adhesive agent layer 2 and the barrier layer 3 (or the barrier layer protective film 3b). The colored layer may be provided outside the base material layer 1. By providing the colored layer, the exterior material 10 can be colored.

The colored layer can be formed by, for example, applying an ink containing a colorant to the surface of the base material layer 1, or the surface of the barrier layer 3 (the surface of the barrier layer protective film 3b when the barrier layer protective film 3b is present). As the colorant, known colorants such as pigments and dyes can be used. The colorants may be used alone, or may be used in combination of two or more thereof.

Specific examples of the colorant contained in the colored layer include the same colorants as those exemplified in the section [Adhesive agent Layer 2].

[Barrier Layer 3]

In the exterior material 10, the barrier layer 3 is a layer which suppresses at least ingress of moisture.

Examples of the barrier layer 3 include metal foils, deposited films and resin layers having a barrier property.

Examples of the deposited film include metal deposited films, inorganic oxide deposited films and carbon-containing inorganic oxide deposited films, and examples of the resin layer include those of polyvinylidene chloride, fluorine-containing resins such as polymers containing chlorotrifluoroethylene (CTFE) as a main component, polymers containing tetrafluoroethylene (TFE) as a main component, polymers having a fluoroalkyl group, and polymers containing a fluoroalkyl unit as a main component, and ethylene vinyl alcohol copolymers. Examples of the barrier layer 3 include resin films provided with at least one of these deposited films and resin layers. A plurality of barrier layers 3 may be provided. Preferably, the barrier layer 3 contains a layer formed of a metal material. Specific examples of the metal material forming the barrier layer 3 include aluminum alloys, stainless steel, titanium steel and steel sheets. When the metal material is used as a metal foil, it is preferable that the metal material includes at least one of an aluminum alloy foil and a stainless steel foil.

The aluminum alloy is more preferably a soft aluminum alloy foil formed of, for example, an annealed aluminum alloy from the viewpoint of improving the moldability of the exterior material 10, and is preferably an aluminum alloy foil containing iron from the viewpoint of further improving the moldability. In the aluminum alloy foil containing iron (100 mass %), the content of iron is preferably 0.1 to 9.0 mass %, more preferably 0.5 to 2.0 mass %. When the content of iron is 0.1 mass % or more, it is possible to obtain an exterior material having more excellent moldability. When the content of iron is 9.0 mass % or less, it is possible to obtain an exterior material more excellent in flexibility. Examples of the soft aluminum alloy foil include aluminum alloy foils having a composition specified in JIS H4160: 1994 A8021H-O, JIS H4160: 1994 A8079H-O, JIS H4000: 2014 A8021P-O, or JIS H4000: 2014 A8079P-O. If necessary, silicon, magnesium, copper, manganese or the like may be added. Softening can be performed by annealing or the like.

Examples of the stainless steel foil include austenitic stainless steel foils, ferritic stainless steel foils, austenitic/ferritic stainless steel foils, martensitic stainless steel foils and precipitation-hardened stainless steel foils. From the viewpoint of providing an exterior material 10 further excellent in moldability, it is preferable that the stainless steel foil is formed of austenitic stainless steel.

Specific examples of the austenite-based stainless steel foil include SUS 304 stainless steel, SUS 301 stainless steel and SUS 316L stainless steel, and of these, SUS 304 stainless steel is especially preferable.

When the barrier layer 3 is a metal foil, the barrier layer 3 may perform a function as a barrier layer suppressing at least ingress of moisture, and has a thickness of, for example, about 9 to 200 µm. For example, the thickness of the barrier layer 3 is preferably about 85 µm or less, more preferably about 50 µm or less, still more preferably about 40 µm or less, especially preferably about 35 µm or less, and preferably about 10 µm or more, more preferably about 20 µm or more, still more preferably about 25 µm or more. The thickness is preferably in the range of about 10 to 85 µm, about 10 to 50 µm, about 10 to 40 µm, about 10 to 35 µm, about 20 to 85 µm, about 20 to 50 µm, about 20 to 40 µm, about 20 to 35 µm, about 25 to 85 µm, about 25 to 50 µm, about 25 to 40 µm, or about 25 to 35 µm. When the barrier layer 3 is formed of an aluminum alloy foil, the thickness thereof is especially preferably in the above-described range, especially preferably about 25 to 85 µm or about 25 to 50 µm. Particularly, when the barrier layer 3 is formed of a stainless steel foil, the thickness of the stainless steel foil is preferably about 60 µm or less, more preferably about 50 µm or less, still more preferably about 40 µm or less, even more preferably about 30 µm or less, especially preferably about 25 µm or less, and preferably about 10 µm or more, more preferably about 15 µm or more. The thickness is about preferably in the range of about 10 to 60 µm, about 10 to 50 µm, about 10 to 40 µm, about 10 to 30 µm, about 10 to 25 µm, about 15 to 60 µm, about 15 to 50 µm, about 15 to 40 µm, about 15 to 30 µm, or about 15 to 25 µm.

[Barrier Layer Protective Films 3a and 3b]

In the exterior material 10, the barrier layer protective film 3a is provided on a surface of the barrier layer 3 on the heat-sealable resin layer 4 side. The exterior material 10 may include the barrier layer protective film 3a only on a surface of the barrier layer 3 on the heat-sealable resin layer 4 side, or may include the barrier layer protective films 3a and 3b on both surfaces of the barrier layer 3, respectively. In the all-solid-state battery 70 of the present disclosure, it is preferable that the barrier protective film 3a is provided on a surface on the heat-sealable resin layer side from the viewpoint of suppressing generation of an alloy on the surface of the barrier layer due to contact between the solid electrolyte and the barrier layer of the exterior material when the all-solid-state battery is constrained by high-pressure pressing from the outside of the exterior material 10. In addition, from the viewpoint of improving the adhesion of the barrier layer 3, it is preferable that barrier protective films 3a and 3b are provided on both surfaces of the barrier layer.

When the barrier layer protective film 3a in the exterior material 10 in the all-solid-state battery 70 of the present disclosure is analyzed by time-of-flight secondary ion mass spectrometry, the ratio of a peak intensity $P_{PO3}$ derived from $PO_3^-$ to a peak intensity $P_{CrPO4}$ derived from $CrPO_4^-$ ($P_{PO3/CrPO4}$) is preferably within the range of 6 to 120.

As described above, in the all-solid-state battery, it is desirable to continuously constrain the all-solid-state battery from the outside of the exterior material even during use for suppressing delamination between the solid electrolyte and the negative active material layer or the positive active material layer. However, when the solid electrolyte, the negative active material layer and the positive active material layer are continuously constrained in a high-pressure state from the outside of the exterior material of the all-solid-state battery, there is a possibility that the heat-sealable resin layer of the exterior material is strongly pressed against the battery element, and thus the thickness of the heat-sealable resin layer (inner layer) of the exterior material decreases, so that a barrier layer laminated on the exterior material comes into contact with the solid electrolyte. In particular, there is a problem that if while the barrier layer of the exterior material is in contact with the solid electrolyte, an electric current passes therebetween, an alloy is generated on the surface of the barrier layer, leading to deterioration of the barrier layer. In contrast, in the all-solid-state battery 70 of the present disclosure, the barrier layer protective film 3a is provided on the surface of the barrier layer 3 of the exterior material 10 to constrain the all-solid-state battery 70 in a high-pressure state, and thus even when a current passes between the barrier layer 3 and the solid electrolyte layer 40 while the solid electrolyte extends through the heat-sealable resin layer 4 and the adhesive layer 5, an alloy is hardly generated on the surface of the barrier layer 3, so that deterioration of the barrier layer 3 is effectively suppressed. In particular, when the peak intensity ratio $P_{PO3/CrPO4}$ of the barrier layer protective film 3a is in the range of 6 to 120, generation of an alloy on the surface of the barrier layer 3 is more effectively suppressed, so that deterioration of the barrier layer 3 is further effectively suppressed.

In the present disclosure, the ratio of the peak intensity $P_{PO3}$ derived from $PO_3^-$ to the peak intensity $P_{CrPO4}$ derived from $CrPO_4^-$ ($P_{PO3/CrPO4}$) is preferably about 10 or more in terms of lower limit, and preferably about 115 or less, more preferably about 110 or less, still more preferably about 50 or less in terms of upper limit. The ratio $P_{PO3/CrPO4}$ is preferably in the range of about 6 to 120, about 6 to 115, about 6 to 110, about 6 to 50, about 10 to 120, about 10 to 115, about 10 to 110 or about 10 to 50, more preferably about 10 to 50, especially preferably in the range of about 25 to 32.

In the present disclosure, when the barrier layer protective film is analyzed by time-of-flight secondary ion mass spectrometry, the ratio of a peak intensity $P_{PO2}$ derived from $PO_2^-$ to a peak intensity $P_{CrPO4}$ derived from $CrPO_4^-$ ($P_{PO2/CrPO4}$) is preferably in the range of 7 or more and 70 or less.

The ratio of the peak intensity $P_{PO2}$ derived from $PO_2^-$ to the peak intensity $P_{CrPO4}$ derived from $CrPO_4$ ($P_{PO2/CrPO4}$) is preferably in the range of 7 to 70, and from the viewpoint of more effectively suppressing deterioration of the barrier layer 3, the ratio $P_{PO2/CrPO4}$ is preferably about 10 or more in terms of lower limit, and preferably about 65 or less, more preferably about 50 or less in terms of upper limit. The ratio $P_{PO2/CrPO4}$ is preferably in the range of about 7 to 70, about 7 to 65, about 7 to 50, about 10 to 70, about 10 to 65 or about 10 to 50, more preferably about 10 to 50, especially preferably about 15 to 37.

In the present disclosure, when the barrier layer protective films 3a and 3b are provided on both surfaces of the barrier layer 3, the peak intensity ratio $P_{PO3/CrPO4}$ is preferably in the above range for both the barrier layer protective films 3a and 3b, and the peak intensity ratio $P_{PO2/CrPO4}$ is preferably in the above-described range.

Specifically, the method for analyzing the barrier layer protective films 3a and 3b by time-of-flight secondary ion mass spectrometry can be carried out under the following measurement conditions using a time-of-flight secondary ion mass spectrometer.

(Measurement Conditions)

Primary ion: double charge ion ($Bi_3^{++}$) of bismuth cluster
Primary ion accelerating voltage: 30 kV
Mass range (m/z): 0 to 1500
Measurement range: 100 μm×100
Number of scans: 16 scan/cycle
Number of pixels (one side): 256 pixels
Etching ion: Ar gas cluster ion beam (Ar-GCIB)
Etching ion accelerating voltage: 5.0 kV Presence of chromium in the barrier layer protective film can be confirmed by X-ray photoelectron spectroscopy. Specifically, first, a layer laminated on the barrier layer (e.g. an adhesive agent layer, a heat-sealable resin layer or an adhesive layer) in the exterior material is physically delaminated. Next, the barrier layer is placed in an electric furnace at about 300° C. for about 30 minutes to remove organic components present on the surface of the barrier layer. Thereafter, the surface of the barrier layer is subjected to X-ray photoelectron spectroscopy to confirm that chromium is present.

The barrier layer protective films 3a and 3b can be formed by subjecting the surface of the barrier layer 3 to chemical conversion treatment with a treatment liquid containing a chromium compound such as chromium oxide.

Examples of the chemical conversion treatment using a treatment liquid containing a chromium compound include a method in which a chromium compound such as chromium oxide dispersed in phosphoric acid and/or a salt thereof is applied to the surface of the barrier layer 3 and baked to form a barrier layer protective film on the surface of the barrier layer 3.

The peak intensity ratio $P_{PO3/CrPO4}$ of the barrier layer protective films 3a and 3b and the peak intensity ratio $P_{PO2/CrPO4}$ can be adjusted by, for example, the composition of the treatment liquid for forming the barrier layer protective films 3a and 3b and the manufacturing conditions such as the temperature and time for baking treatment after the treatment.

The ratio of the chromium compound and phosphoric acid and/or a salt thereof in the treatment liquid containing the chromium compound is not particularly limited, and from the viewpoint of setting each of the peak intensity ratio $P_{PO3/CrPO4}$ and the peak intensity ratio $P_{PO2/CrPO4}$ within the above-described range, the ratio of phosphoric acid and/or a salt thereof to 100 parts by mass of the chromium compound is preferably about 30 to 120 parts by mass, more preferably about 40 to 110 parts by mass. As phosphoric acid and a salt thereof, for example, condensed phosphoric acid and a salt thereof can also be used.

The treatment liquid containing a chromium compound may further contain an anionic polymer and a crosslinking agent for crosslinking the anionic polymer. Examples of the anionic polymer include poly (meth)acrylic acid or salts thereof, and copolymers containing (meth)acrylic acid or a salt thereof as a main component. Examples of the crosslinking agent include a compounds having any functional group selecting from an isocyanate group, a glycidyl group, a carboxyl group, and an oxazoline group and a silane coupling agent. There may be one anionic polymer and crosslinking agent, or two or more anionic polymers and crosslinking agents.

From the viewpoint of effectively suppressing deterioration of the barrier layer 3, it is preferable that the treatment liquid containing a chromium compound contains an aminated phenol polymer or an acryl-based resin. When the treatment liquid containing a chromium compound contains an aminated phenol polymer, the content of the aminated phenol polymer is preferably about 100 to 400 parts by mass, more preferably about 200 to 300 parts by mass, based on 100 parts by mass of the chromium compound. The weight average molecular weight of the aminated phenol polymer is preferably about 5,000 to 20,000. The weight average molecular weight of the aminated phenol polymer is a value obtained by performing measurement by gel permeation chromatography (GPC) under the condition of using polystyrene as a standard sample.

In addition, the acryl-based resin is preferably polyacrylic acid, an acrylic acid-methacrylic acid ester copolymer, an acrylic acid-maleic acid copolymer, an acrylic acid-styrene copolymer, or a derivative thereof such as a sodium salt, an ammonium salt or an amine salt thereof. In particular, a derivative of polyacrylic acid such as an ammonium salt, a sodium salt or an amine salt of polyacrylic acid is preferable. In the present disclosure, the polyacrylic acid means a polymer of acrylic acid. The acryl-based resin is also preferably a copolymer of acrylic acid and dicarboxylic acid or dicarboxylic anhydride, and is also preferably an ammonium salt, a sodium salt or an amine salt of a copolymer of acrylic acid and dicarboxylic acid or dicarboxylic anhydride. The acryl-based resins may be used alone, or may be used in combination of two or more thereof.

The weight average molecular weight of the acryl-based resin is preferably about 1,000 to 1,000,000, more preferably about 3,000 to 800,000, still more preferably about 10,000 to 800,000. As the molecular weight increases, the durability is enhanced, but the water-solubility of the acryl-based resin decreases, so that the coating solution becomes instable, leading to deterioration of production stability. Conversely, the durability is deteriorated as the molecular weight increases. In the present disclosure, high durability is obtained when the weight average molecular weight of the acryl-based resin is 1,000 or more, and good production stability the durability is obtained when the weight average molecular weight is 1,000,000 or less. In the present disclosure, the weight average molecular weight of the acryl-based resin is a value obtained by performing measurement by gel permeation chromatography (GPC) under the condition of using polystyrene as a standard sample.

The acid value of the acryl-based resin is preferably large because a larger number of COOH groups may have a higher effect of contributing to bondability, but when a salt is formed as described above, it may be impossible to indicate the amount of O—C=O bonds by the acid value, and thus it is considered that bondability can be more reliably estimated by analysis from an XPS spectrum of O—C=O bonds as in the present disclosure.

When the treatment liquid containing a chromium compound contains an acryl-based resin, the content of the acryl-based resin is preferably about 50 to 400 parts by mass, more preferably about 80 to 200 parts by mass, based on 100 parts by mass of the chromium compound.

From the same viewpoint, the chromium compound is preferably at least one of chromium fluoride (III) and chromium nitrate (III). A coordinated crosslinked structure centered on a Cr atom and a high-durability film structure of aluminum fluoride may be formed.

The solvent of the treatment liquid containing a chromium compound is not particularly limited as long as it enables dispersion of components contained in the treatment liquid and can be evaporated by subsequent heating, and water is preferable.

The solid content concentration of the chromium compound present in the treatment liquid for forming the barrier layer protective films $3a$ and $3b$ is not particularly limited, and is, for example, about 1 to 15 mass %, preferably about 7.0 to 12.0 mass %, more preferably about 8.0 to 11.0 mass %, still more preferably about 9.0 to 10.0 mass % from the viewpoint of setting each of the peak intensity ratio $P_{PO3/CrPO4}$ and the peak intensity ratio $P_{PO2/CrPO4}$ within the predetermined range to effectively suppress deterioration of the barrier layer 3.

The thickness of each of the barrier layer protective films $3a$ and $3b$ is not particularly limited, and is preferably about 1 nm to 10 µm, more preferably about 1 to 100 nm, still more preferably about 1 to 50 nm from the viewpoint of effectively suppressing deterioration of the barrier layer 3. The thickness of the barrier layer protective film can be measured by observation with a transmission electron microscope or a combination of observation with a transmission electron microscope and energy dispersive X-ray spectroscopy or electron beam energy loss spectroscopy.

From the same viewpoint, the amounts of the barrier layer protective films $3a$ and $3b$ per 1 m$^2$ of the surface of the barrier layer 3 are each preferably about 1 to 500 mg, more preferably about 1 to 100 mg, still more preferably about 1 to 50 mg.

Examples of the method for applying the treatment liquid containing a chromium compound to the surface of the barrier layer include a bar coating method, a roll coating method, a gravure coating method and an immersion method.

From the viewpoint of setting each of the peak intensity ratio $P_{PO3/CrPO4}$ and the peak intensity ratio $P_{PO2/CrPO4}$ within the predetermined range to effectively suppress the deterioration of the barrier layer 3, the heating temperature at the time of baking the treatment liquid to form the barrier layer protective film is preferably about 170 to 250° C., more preferably about 180 to 230° C., still more preferably about 190 to 220° C. From the same viewpoint, the baking time is preferably about 2 to 10 seconds, more preferably about 3 to 6 seconds.

From the viewpoint of more efficiently performing the chemical conversion treatment of the surface of the barrier layer 3, it is preferable to perform degreasing treatment by a known treatment method such as an alkali immersion method, an electrolytic cleaning method, an acid cleaning method, an electrolytic acid cleaning method or an acid activation method before the barrier layer protective films $3a$ and $3b$ are provided on the surface of the barrier layer 3.

[Heat-Sealable Resin Layer 4]

In the exterior material 10, the heat-sealable resin layer 4 is a layer (sealant layer) which corresponds to an innermost layer and performs a function of hermetically sealing the battery element with the heat-sealable resin layers heat-sealed to each other during construction of the all-solid-state battery.

The resin forming the heat-sealable resin layer 4 is not particularly limited as long as it can be heat-sealed, and is preferably a resin containing a polyolefin skeleton, such as a polyolefin or an acid-modified polyolefin. The resin forming the heat-sealable resin layer 4 can be confirmed to contain a polyolefin backbone by an analysis method such as infrared spectroscopy or gas chromatography mass spectrometry. In addition, it is preferable that a peak derived from maleic anhydride is detected when the resin forming the heat-sealable resin layer 4 is analyzed by infrared spectroscopy. For example, when a maleic anhydride-modified polyolefin is measured by infrared spectroscopy, peaks derived from maleic anhydride are detected near wave numbers of 1760 cm$^{-1}$ and 1780 cm$^{-1}$. When the heat-sealable resin layer 4 is a layer formed of a maleic anhydride-modified polyolefin, a peak derived from maleic anhydride is detected when measurement is performed by infrared spectroscopy. However, if the degree of acid modification is low, the peaks may be too small to be detected. In that case, the peaks can be analyzed by nuclear magnetic resonance spectroscopy.

Specific examples of the polyolefin to be acid-modified include polyethylenes such as low-density polyethylene, medium-density polyethylene, high-density polyethylene and linear low-density polyethylene; ethylene-α-olefin copolymers; polypropylene such as homopolypropylene, block copolymers of polypropylene (e.g., block copolymers of propylene and ethylene) and random copolymers of polypropylene (e.g., random copolymers of propylene and ethylene); propylene-α-olefin copolymers; and terpolymers of ethylene-butene-propylene. Among them, polypropylene is preferable. The polyolefin resin in the case of a copolymer may be a block copolymer or a random copolymer. These polyolefin-based resins may be used alone, or may be used in combination of two or more thereof.

The polyolefin may be a cyclic polyolefin. The cyclic polyolefin is a copolymer of an olefin and a cyclic monomer, and examples of the olefin as a constituent monomer of the cyclic polyolefin include ethylene, propylene, 4-methyl-1- pentene, styrene, butadiene and isoprene. Examples of the cyclic monomer as a constituent monomer of the cyclic polyolefin include cyclic alkenes such as norbornene; cyclic dienes such as cyclopentadiene, dicyclopentadiene, cyclohexadiene and norbornadiene. Among these polyolefins, cyclic alkenes are preferable, and norbornene is more preferable.

The acid-modified polyolefin is a polymer with the polyolefin modified by subjecting the polyolefin to block polymerization or graft polymerization with an acid component. As the polyolefin to be acid-modified, the above-mentioned polyolefins, copolymers obtained by copolymerizing polar molecules such as acrylic acid or methacrylic acid with the above-mentioned polyolefins, polymers such as crosslinked polyolefins, or the like can also be used. Examples of the acid component to be used for acid modification include carboxylic acids such as maleic acid, acrylic acid, itaconic acid, crotonic acid, maleic anhydride and itaconic anhydride, and anhydrides thereof.

The acid-modified polyolefin may be an acid-modified cyclic polyolefin. The acid-modified cyclic polyolefin is a polymer obtained by copolymerizing a part of monomers forming the cyclic polyolefin in place of an acid component, or block-polymerizing or graft-polymerizing an acid component with the cyclic polyolefin. The cyclic polyolefin to be modified with an acid is the same as described above. The acid component to be used for acid modification is the same as the acid component used for modification of the polyolefin.

Examples of preferred acid-modified polyolefins include polyolefins modified with a carboxylic acid or an anhydride thereof, polypropylene modified with a carboxylic acid or an anhydride thereof, maleic anhydride-modified polyolefins, and maleic anhydride-modified polypropylene.

The heat-sealable resin layer 4 may be formed from one resin alone, or may be formed from a blend polymer obtained by combining two or more resins. Further, the heat-sealable resin layer 4 may be formed of only one layer, but may be formed of two or more layers with the same resin or different resins.

The heat-sealable resin layer 4 may contain a lubricant etc. if necessary. When the heat-sealable resin layer 4 contains a lubricant, moldability of the exterior material 10 can be improved. The lubricant is not particularly limited, and a known lubricant can be used. The lubricants may be used alone, or may be used in combination of two or more thereof.

The lubricant is not particularly limited, and is preferably an amide-based lubricant. Specific examples of the lubricant include those exemplified for the base material layer 1. The lubricants may be used alone, or may be used in combination of two or more thereof.

When a lubricant is present on the surface of the heat-sealable resin layer 4, the amount of the lubricant present is not particularly limited, and is preferably about 10 to 50 mg/m$^2$, more preferably about 15 to 40 mg/m$^2$ from the viewpoint of improving the moldability of the exterior material.

The lubricant present on the surface of the heat-sealable resin layer 4 may be one obtained by exuding the lubricant contained in the resin forming the heat-sealable resin layer 4, or one obtained by applying a lubricant to the surface of the heat-sealable resin layer 4.

The thickness of the heat-sealable resin layer 4 is not particularly limited as long as the heat-sealable resin layers are heat-sealed to each other to exhibit a function of sealing the battery element, and the thickness of the heat-sealable resin layer 4 is, for example, about 100 μm or less, preferably about 85 μm or less, more preferably about 15 to 85 μm. For example, when the thickness of the adhesive layer 5 described later is 10 μm or more, the thickness of the heat-sealable resin layer 4 is preferably about 85 μm or less, more preferably about 15 to 45 μm, and for example, when the thickness of the adhesive layer 5 described later is less than 10 μm or when the adhesive layer 5 is not provided, the thickness of the heat-sealable resin layer 4 is preferably about 20 μm or more, more preferably about 35 to 85 μm.

[Adhesive Layer 5]

In the exterior material 10, the adhesive layer 5 is a layer provided between the barrier layer protective film 3a and the heat-sealable resin layer 4 if necessary for strongly bonding these layers to each other.

The adhesive layer 5 is formed from a resin capable of bonding the barrier layer protective film 3a and the heat-sealable resin layer 4 to each other. The resin to be used for forming the adhesive layer 5 is, for example, the same as that of the adhesive exemplified for the adhesive agent layer 2. Preferably, the resin to be used for forming the adhesive layer 5 contains a polyolefin backbone. Examples thereof include the polyolefins and acid-modified polyolefins exemplified for the heat-sealable resin layer 4 described above. The resin forming the adhesive layer 5 can be confirmed to contain a polyolefin backbone by an analysis method such as infrared spectroscopy or gas chromatography mass spectrometry, and the analysis method is not particularly limited. In addition, it is preferable that a peak derived from maleic anhydride is detected when the resin forming the adhesive layer 5 is analyzed by infrared spectroscopy. For example, when a maleic anhydride-modified polyolefin is measured by infrared spectroscopy, peaks derived from maleic anhydride are detected near wave numbers of 1760 cm$^{-1}$ and 1780 cm$^{-1}$. However, if the degree of acid modification is low, the peaks may be too small to be detected. In that case, the peaks can be analyzed by nuclear magnetic resonance spectroscopy.

From the viewpoint of firmly bonding the barrier layer protective film 3a and the heat-sealable resin layer 4 to each other, it is preferable that the adhesive layer 5 contains an acid-modified polyolefin. As the acid-modified polyolefin, polyolefins modified with a carboxylic acid or an anhydride thereof, polypropylene modified with a carboxylic acid or an anhydride thereof, maleic anhydride-modified polyolefins, and maleic anhydride-modified polypropylene is especially preferable.

Further, from the viewpoint of obtaining an exterior material excellent in shape stability after molding while decreasing the thickness of the exterior material 10, the adhesive layer 5 is more preferably a cured product of a resin composition containing an acid-modified polyolefin and a curing agent. Preferred examples of the acid-modified polyolefin include those described above.

The adhesive layer 5 is preferably a cured product of a resin composition containing an acid-modified polyolefin and at least one selected from the group consisting of a compound having an isocyanate group, a compound having an oxazoline group, and a compound having an epoxy group, especially preferably a cured product of a resin composition containing an acid-modified polyolefin and at least one selected from the group consisting of a compound having an isocyanate group and a compound having an epoxy group. Preferably, the adhesive layer 5 preferably contains at least one selected from the group consisting of polyurethane, polyester and epoxy resin. More preferably, the adhesive layer 5 contains polyurethane and epoxy resin.

As the polyester, for example, an amide ester resin is preferable. The amide ester resin is generally produced by reaction of a carboxyl group with an oxazoline group. The adhesive layer 5 is more preferably a cured product of a resin composition containing at least one of these resins and the acid-modified polyolefin. When an unreacted substance of a curing agent, such as a compound having an isocyanate group, a compound having an oxazoline group, or an epoxy resin remains in the adhesive layer 5, the presence of the unreacted substance can be confirmed by, for example, a method selected from infrared spectroscopy, Raman spectroscopy, time-of-flight secondary ion mass spectrometry (TOF-SIMS) and the like.

From the viewpoint of further improving adhesion between the barrier layer protective film 3a and the adhesive layer 5, the adhesive layer 5 is preferably a cured product of a resin composition containing a curing agent having at least one selected from the group consisting of an oxygen atom, a heterocyclic ring, a C=N bond, and a C—O—C bond. Examples of the curing agent having a heterocyclic ring include curing agents having an oxazoline group, and curing agents having an epoxy group. Examples of the curing agent having a C=N bond include curing agents having an oxazoline group and curing agents having an isocyanate group. Examples of the curing agent having a C—O—C bond include curing agents having an oxazoline group, curing agents having an epoxy group, and polyurethane. Whether the adhesive layer 5 is a cured product of a resin composition containing any of these curing agents can be confirmed by, for example, a method such as gas chromatography-mass spectrometry (GCMS), infrared spectroscopy (IR), time-of-flight secondary ion mass spectrometry (TOF-SIMS), or X-ray photoelectron spectroscopy (XPS).

The compound having an isocyanate group is not particularly limited, and is preferably a polyfunctional isocyanate compound from the viewpoint of effectively improving adhesion between the barrier layer protective film 3a and the adhesive layer 5. The polyfunctional isocyanate compound is not particularly limited as long as it is a compound having two or more isocyanate groups. Specific examples of the polyfunctional isocyanate-based curing agent include pentane diisocyanate (PDI), isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers. Examples thereof include adduct forms, biuret forms, and isocyanurate forms.

The content of the compound having an isocyanate group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer protective film 3a and the adhesive layer 5.

The compound having an oxazoline group is not particularly limited as long as it is a compound having an oxazoline backbone. Specific examples of the compound having an oxazoline group include compounds having a polystyrene main chain and compounds having an acrylic main chain. Examples of the commercially available product include EPOCROS series manufactured by Nippon Shokubai Co., Ltd.

The proportion of the compound having an oxazoline group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer protective film 3a and the adhesive layer 5.

Examples of the compound having an epoxy group include epoxy resins. The epoxy resin is not particularly limited as long as it is a resin capable of forming a crosslinked structure by epoxy groups existing in the molecule, and a known epoxy resin can be used. The weight average molecular weight of the epoxy resin is preferably about 50 to 2000, more preferably about 100 to 1000, still more preferably about 200 to 800. In the present invention, the weight average molecular weight of the epoxy resin is a value obtained by performing measurement by gel permeation chromatography (GPC) under the condition of using polystyrene as a standard sample.

Specific examples of the epoxy resin include glycidyl ether derivatives of trimethylolpropane, bisphenol A diglycidyl ether, modified bisphenol A diglycidyl ether, novolak glycidyl ether, glycerin polyglycidyl ether and polyglycerin polyglycidyl ether. The epoxy resins may be used alone, or may be used in combination of two or more thereof.

The proportion of the epoxy resin in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer protective film 3a and the adhesive layer 5.

The polyurethane is not particularly limited, and a known polyurethane can be used. The adhesive layer 5 may be, for example, a cured product of two-liquid curable polyurethane.

The proportion of the polyurethane in the adhesive layer 5 is preferably in the range of 0.1 to 50 mass %, more preferably in the range of 0.5 to 40 mass % in the resin composition forming the adhesive layer 5.

When the adhesive layer 5 is a cured product of a resin composition containing at least one selected from the group consisting of a compound having an isocyanate group, a compound having an oxazoline group and an epoxy resin, and the acid-modified polyolefin, the acid-modified polyolefin functions as a main agent, and the compound having an isocyanate group, the compound having an oxazoline group, and the compound having an epoxy group each function as a curing agent.

The thickness of the adhesive layer 5 is preferably about 50 μm or less, about 40 μm or less, about 30 μm or less, about 20 μm or less, or about 5 μm or less, and preferably about 0.1 μm or more or about 0.5 μm or more. The thickness is preferably in the range of about 0.1 to 50 μm, about 0.1 to 40 μm, about 0.1 to 30 μm, about 0.1 to 20 μm, about 0.1 to 5 μm, about 0.5 to 50 μm, about 0.5 to 40 μm, about 0.5 to 30 μm, about 0.5 to 20 μm or about 0.5 to 5 μm. More specifically, the thickness is preferably about 1 to 10 μm, more preferably about 1 to 5 μm in the case of the adhesive exemplified for the adhesive agent layer 2 or a cured product of an acid-modified polyolefin with a curing agent. When any of the resins exemplified for the heat-sealable resin layer 4 is used, the thickness of the adhesive layer is preferably about 2 to 50 μm, more preferably about 10 to 40 μm. When the adhesive layer 5 is a cured product of a resin composition containing the adhesive exemplified for the adhesive agent layer 2 or an acid-modified polyolefin and a curing agent, the adhesive layer 5 can be formed by, for example, applying the resin composition and curing the resin composition by heating or the like. When the resin exemplified for the heat-sealable resin layer 4 is used, for example, extrusion molding of the heat-sealable resin layer 4 and the adhesive layer 5 can be performed.

[Surface Coating Layer 6]

The exterior material 10 may include a surface coating layer 6 on the base material layer 1 of the laminate (on a side opposite to the barrier layer 3 from the base material layer 1) if necessary for the purpose of improving at least one of designability, scratch resistance, moldability and the like. The surface coating layer 6 is a layer located on the outermost layer side of the exterior material 10 when the all-solid-state battery is constructed using the exterior material 10.

The surface coating layer 6 can be formed from, for example, a resin such as polyvinylidene chloride, polyester, polyurethane, acrylic resin or epoxy resin.

When the resin forming the surface coating layer 6 is a curable resin, the resin may be any of a one-liquid curable type and a two-liquid curable type, and is preferably a two-liquid curable type. Examples of the two-liquid curable resin include two-liquid curable polyurethane, two-liquid curable polyester and two-liquid curable epoxy resins. Of these, two-liquid curable polyurethane is preferable.

Examples of the two-liquid curable polyurethane include polyurethane which contains a main agent containing a polyol compound and a curing agent containing an isocyanate compound. The polyurethane is preferably two-liquid curable polyurethane having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound.

If necessary, the surface coating layer 6 may contain additives such as the lubricant, an anti-blocking agent, a matting agent, a flame retardant, an antioxidant, a tackifier and an anti-static agent on at least one of the surface and the inside of the surface coating layer 6 according to the functionality and the like to be imparted to the surface coating layer 6 and the surface thereof. The additives are in the form of, for example, fine particles having an average particle diameter of about 0.5 nm to 5 μm. The average particle diameter of the additives is a median diameter measured by a laser diffraction/scattering particle size distribution measuring apparatus.

The additives may be either inorganic substances or organic substances. The shape of the additive is not particularly limited, and examples thereof include a spherical shape, a fibrous shape, a plate shape, an amorphous shape and a scaly shape.

Specific examples of the additives include talc, silica, graphite, kaolin, montmorillonite, mica, hydrotalcite, silica gel, zeolite, aluminum hydroxide, magnesium hydroxide, zinc oxide, magnesium oxide, aluminum oxide, neodymium oxide, ant imony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, acrylate resins, crosslinked acryl, crosslinked styrene, crosslinked polyethylene, benzoguanamine, gold, aluminum, copper and nickel. The additives may be used alone, or may be used in combination of two or more thereof. Of these additives, silica, barium sulfate and titanium oxide are preferable from the viewpoint of dispersion stability, costs and so on. The surface of the additive may be subjected to various kinds of surface treatments such as insulation treatment and dispersibility enhancing treatment.

The method for forming the surface coating layer 6 is not particularly limited, and examples thereof include a method in which a resin for forming the surface coating layer 6 is applied. When the additive is added to the surface coating layer 6, a resin mixed with the additive may be applied.

The thickness of the surface covering layer 6 is not particularly limited as long as the above-mentioned function as the surface coating layer 6 is performed, and it is, for example, about 0.5 to 10 μm, preferably about 1 to 5 μm.

The method for manufacturing the exterior material 10 is not particularly limited as long as a laminate is obtained in which the layers of the exterior material 10 are laminated. Examples thereof include a method including the step of laminating at least the base material layer 1, the barrier layer 3, the barrier layer protective film 3a formed on the surface of the barrier layer 3, and the heat-sealable resin layer 4 in this order.

One example of a method for manufacturing the exterior material 10 is as follows. First, a laminate is formed in which the base material layer 1, the adhesive agent layer 2, the barrier layer 3, and the barrier layer protective film 3a formed on the barrier layer 3 are laminated in this order (hereinafter, the laminate may be described as a "laminate A"). Specifically, the laminate A can be formed by a dry lamination method in which an adhesive to be used for formation of the adhesive agent layer 2 is applied onto the base material layer 1 or the barrier layer 3 provided with the barrier layer protective film 3a (and the barrier layer protective film 3b if necessary), using a coating method such as a gravure coating method or a roll coating method, and dried, the barrier layer 3 or the base material layer 1 is then laminated, and the adhesive agent layer 2 is cured.

The heat-sealable resin layer 4 is then laminated on the barrier layer protective film 3a of the laminate A. When the heat-sealable resin layer 4 is laminated directly on the barrier layer protective film 3a, a resin component that forms the heat-sealable resin layer 4 may be applied onto the barrier layer protective film 3a of the laminate A by a method such as a gravure coating method or a roll coating method. When the adhesive layer 5 is provided between the barrier layer protective film 3a and the heat-sealable resin layer 4, mention is made of, for example, (1) a method in which the adhesive layer 5 and the heat-sealable resin layer 4 are co-extruded to be laminated on the barrier layer protective film 3a of the laminate A (co-extrusion lamination method); (2) a method in which the adhesive layer 5 and the heat-sealable resin layer 4 are laminated to form a laminate separately, and the laminate is laminated on the barrier layer protective film 3a of the laminate A by a thermal lamination method; (3) a method in which an adhesive for formation of the adhesive layer 5 is laminated on the barrier layer protective film 3a of the laminate A by an extrusion method or a method in which the adhesive is applied by solution coating, dried at a high temperature and baked, and the heat-sealable resin layer 4 formed in a sheet shape beforehand is laminated on the adhesive layer 5 by a thermal lamination method; and (4) a method in which the melted adhesive layer 5 is poured between the barrier layer protective film 3a of the laminate A and the heat-sealable resin layer 4 formed in a sheet shape beforehand, and simultaneously the laminate A and the heat-sealable resin layer 4 are bonded together with the adhesive layer 5 interposed therebetween (sandwich lamination).

When the surface coating layer 6 is provided, the surface coating layer 6 is laminated on a surface of the base material layer 1 on a side opposite to the barrier layer 3. The surface covering layer 6 can be formed by, for example, coating a surface of the base material layer 1 with the resin that forms the surface coating layer 6. The order of the step of laminating the barrier layer 3 on a surface of the base material layer 1 and the step of laminating the surface coating layer 6 on a surface of the base material layer 1 is not particularly limited. For example, the surface coating layer 6 may be formed on a surface of the base material layer 1, followed by forming the barrier layer 3 on a surface of the base material layer 1 on a side opposite to the surface coating layer 6.

A laminate including the surface coating layer 6 provided if necessary, the base material layer 1 provided if necessary, the adhesive agent layer 2 provided if necessary, the barrier layer protective film 3b provided if necessary, the barrier layer 3, the barrier layer protective film 3a, the adhesive layer 5 provided if necessary, and the heat-sealable resin layer 4 in this order is formed in the manner described above, and the laminate may be further subjected to a heating treatment of a hot roll contact type, a hot air type, a near-infrared type, a far-infrared type or the like for enhancing the bondability of the adhesive agent layer 2 and the adhesive layer 5 provided if necessary. As conditions for such a heating treatment, for example, the temperature is about 150 to 250° C., and the time is about 1 to 5 minutes.

The layers that form the exterior material 10 may be subjected to a surface activation treatment such as a corona treatment, a blast treatment, an oxidation treatment or an ozone treatment if necessary for improving or stabilizing film formability, lamination processing and final product secondary processing (pouching and embossing molding) suitability, and the like. For example, by subjecting at least one surface of the base material layer to a corona treatment, film formability, lamination processing and final product secondary processing suitability, and the like can be improved. Further, for example, by subjecting a surface of the base material layer 1, which is opposite to the barrier layer 3, to a corona treatment, the ink printability of the surface of the base material layer 1 can be improved.

EXAMPLES

Hereinafter, the present disclosure will be described in detail by way of examples and comparative examples. However, the present disclosure is not limited to examples.

Production of Exterior Material

Preparation Example 1

In addition, barrier layer including an aluminum foil (JIS H4160: 1994A 8021 H-O, thickness: 40 μm) was prepared. Both surfaces of the barrier layer were subjected to chemical conversion treatment by the later-described method to form a barrier layer protective film (thickness: 10 nm). Maleic anhydride-modified polypropylene (thickness: 40 μm) as an adhesive layer and polypropylene (thickness: 40 μm) as a heat-sealable resin layer were co-extruded onto the barrier layer protective film to laminate an adhesive layer and a heat-sealable resin layer. Next, the obtained laminate was aged and heated to obtain an exterior material including a laminate in which a barrier layer protective film (10 nm), a barrier layer (40 μm), a barrier layer protective film (10 nm), an adhesive layer (40 μm) and a heat-sealable resin layer (40 μm) were laminated in this order.

The barrier layer protective film was formed on both surfaces of the barrier layer as follows. A treatment liquid containing 43 parts by mass of an aminated phenol polymer, 16 parts by mass of chromium fluoride and 13 parts by mass of phosphoric acid based on 100 parts by mass of water was prepared, and the treatment liquid was applied to both surfaces of the barrier layer (film thickness after drying is 10 nm), and heated and dried for about 3 seconds at a temperature of about 190° C. in terms of the surface temperature of the barrier layer.

Preparation Example 2

Except that thermal lamination was performed with a hole of φ1 mm made on the coextruded film with an adhesive layer and a heat-sealable resin layer for exposing a surface of the barrier layer protective film, the same procedure as in Preparation Example 1 was carried out to obtain an exterior material.

Preparation Example 3

As a base material layer, a laminated film was prepared in which a polyethylene terephthalate film (12 μm), an adhesive agent layer (two-liquid curable urethane adhesive (polyol compound and aromatic isocyanate compound), thickness: 3 μm) and a biaxially oriented nylon film (thickness: 15 μm) were laminated in this order. Next, a barrier layer having barrier layer protective films formed on both surfaces was prepared in the same manner as in Preparation Example 1, and the barrier layer and the base material layer were laminated by a dry lamination method. Specifically, a two-liquid curable urethane adhesive (polyol compound and aromatic isocyanate compound) was applied to one surface of the barrier layer protective film formed on the surface of the barrier layer to form an adhesive agent layer (thickness after curing: 3 μm). Subsequently, the adhesive agent layer and the biaxially stretched nylon film were laminated, and aging treatment was then performed to prepare a laminate of base material layer/adhesive layer/barrier layer protective film/barrier layer/barrier layer protective film. Maleic anhydride-modified polypropylene (thickness: 40 μm) as an adhesive layer and polypropylene (thickness: 40 μm) as a heat-sealable resin layer were co-extruded onto the barrier layer protective film of the obtained laminate to laminate an adhesive layer and a heat-sealable resin layer. Next, the obtained laminate was aged and heated to obtain a laminate in which a base material layer (polyethylene terephthalate film (12 μm)), an adhesive agent layer (3 μm), a biaxially oriented nylon film (15 μm), an adhesive agent layer (3 μm), a barrier layer protective film (10 nm), a barrier layer (40 μm), a barrier layer protective film (10 nm), an adhesive layer (40 μm) and a heat-sealable resin layer (40 μm) were laminated in this order. In Preparation Example 3, thermal lamination was performed with a hole of φ1 mm made on the coextruded film with an adhesive layer and a heat-sealable resin layer for exposing a surface of the barrier layer protective film as in Preparation Example 2.

Preparation Example 4

Except that a biaxially oriented nylon film (thickness: 25 μm) was used as the base material layer, the same procedure as in Example 3 was carried out to obtain an exterior material including a laminate in which a base material layer (biaxially oriented nylon film (25 μm)), an adhesive agent layer (3 μm), a barrier layer protective film (10 nm), a barrier layer (40 μm), a barrier layer protective film (10 nm), an adhesive layer (40 μm) and a heat-sealable resin layer (40 μm) were laminated in this order. In Preparation Example 4, thermal lamination was performed with a hole of φ1 mm made on the coextruded film with an adhesive layer and a heat-sealable resin layer for exposing a surface of the barrier layer protective film as in Preparation Example 2.

Preparation Example 5

Except that with respect to Preparation Example 2, the barrier layer protective film was formed on both surfaces of the barrier layer as follows, the same procedure as in Preparation Example 2 was carried out to obtain an exterior material. In Preparation Example 5, thermal lamination was performed with a hole of φ1 mm made on the coextruded film with an adhesive layer and a heat-sealable resin layer for exposing a surface of the barrier layer protective film as in Preparation Example 2. The barrier layer protective film was formed on the surfaces of the barrier layer as follows. A treatment liquid containing 2 parts by mass of an acryl-based resin (polyacrylic acid (molecular weight: 10,000, acid value: 778)), 2 parts by mass of chromium nitrate and 2 parts by mass of phosphoric acid based on 100 parts by mass of water was prepared, and the treatment liquid was applied to both surfaces of the barrier layer (film thickness after drying is 30 nm), and heated and dried for about 3 seconds at a temperature of about 190° C. in terms of the surface temperature of the barrier layer.

Comparative Preparation Example 1

Except that the barrier layer protective film was not formed on both surfaces of the barrier layer, the same procedure as in Preparation Example 1 was carried out to obtain an exterior material including a laminate in which a barrier layer (40 μm), an adhesive layer (40 μm) and a heat-sealable resin layer (40 μm) were laminated in this order.

Comparative Preparation Example 2

Except that thermal lamination was performed with a hole of φ1 mm made on the coextruded film with an adhesive layer and a heat-sealable resin layer for exposing a surface of the barrier layer protective film, the same procedure as in Comparative Preparation Example 1 was carried out to obtain an exterior material.

Comparative Preparation Example 3

Except that the barrier layer protective film was not formed on both surfaces of the barrier layer, the same procedure as in Preparation Example 3 was carried out to obtain an exterior material including a laminate in which a base material layer (polyethylene terephthalate film (12 μm)), an adhesive agent layer (3 μm), a biaxially stretched nylon film (15 μm), an adhesive agent layer (3 μm), a barrier layer (40 μm)/an adhesive layer (40 μm) and a heat-sealable resin layer (40 μm) were laminated in this order. In Comparative Preparation Example 3, thermal lamination was performed with a hole of φ1 mm made on the coextruded film with an adhesive layer and a heat-sealable resin layer for exposing a surface of the barrier layer protective film as in Comparative Preparation Example 2.

Comparative Preparation Example 4

Except that the barrier layer protective film was not formed on both surfaces of the barrier layer, the same procedure as in Preparation Example 4 was carried out to obtain an exterior material including a laminate in which a base material layer (biaxially oriented nylon film (25 μm)), an adhesive agent layer (3 μm), a biaxially stretched nylon film (15 μm), an adhesive agent layer (3 μm), a barrier layer (40 μm)/an adhesive layer (40 μm) and a heat-sealable resin layer (40 μm) were laminated in this order. In Comparative Preparation Example 4, thermal lamination was performed with a hole of φ1 mm made on the coextruded film with an adhesive layer and a heat-sealable resin layer for exposing a surface of the barrier layer as in Comparative Preparation Example 2.

Reference Example 1

An aluminum alloy foil (barrier layer) having barrier layer protective films formed on both surfaces as used in Preparation Example 1 was prepared.

Reference Example 2

An aluminum alloy foil (barrier layer) having no barrier layer protective film formed on any of both surfaces as used in Preparation Example 1 was prepared.
<Time-of-Flight Secondary Ion Mass Spectrometry>
The barrier layer protective film was analyzed as follows. First, for a sample in which a barrier layer and an adhesive layer were laminated, the barrier layer and the adhesive layer were peeled off from each other. Here, the film was physically delaminated without using water, an organic solvent, an aqueous solution of an acid or an alkali, or the like. After delamination between the barrier layer and the adhesive layer, the adhesive layer remained on the surface of the barrier layer, and the remaining adhesive layer was removed by etching with Ar-GCIB. For the surface of the barrier layer thus obtained, the barrier layer protective film was analyzed by time-of-flight secondary ion mass spectrometry. Table 1 shows the peak intensities $P_{CrPO4}$, $P_{PO2}$ and $P_{PO3}$ derived from $CrPO_4^-$, $PO_2^-$ and $PO_3^-$, the ratio of the peak intensity $P_{PO2}$ to the peak intensity $P_{CrPO4}$ ($P_{PO2/CrPO4}$) and the ratio of the peak intensity $P_{PO3}$ to the peak intensity $P_{CrPO4}$ ($P_{PO3/CrPO4}$). In Comparative Preparation Examples 1 to 4 and Reference Example 2, a barrier layer protective film was not formed on the surface of the barrier layer, and therefore in Table 1, items on the peak intensity $P_{CrPO4}$ of $CrPO_4^-$ are indicated by "–".

Details of the measuring apparatus and measurement conditions for time-of-flight secondary ion mass spectrometry are as follows.
  Measuring apparatus: time-of-flight secondary ion mass spectrometer TOF.SIMS5 manufactured by ION-TOF Corporation
(Measurement Conditions)
  Primary ion: double charge ion ($Bi_3^{++}$) of bismuth cluster
  Primary ion accelerating voltage: 30 kV
  Mass range (m/z): 0 to 1500
  Measurement range: 100 μm×100 μm
  Number of scans: 16 scan/cycle
  Number of pixels (one side): 256 pixels
  Etching ion: Ar gas cluster ion beam (Ar-GCM)
  Etching ion accelerating voltage: 5.0 kV
<Evaluation on Deterioration of Barrier Layer by Constraint in High-Pressure Pressing>
The exterior materials obtained in Preparation Examples 1 to 5 and Comparative Preparation Examples 1 to 4 and the barrier layers of Reference Examples 1 and 2 were each taken as a test piece. High-pressure pressing (50 MPa) was applied with a sulfide solid electrolyte ($Li_2S:P_2S_5=75:25$, thickness 300 μm) disposed between the test piece and a lithium indium alloy (LiIn alloy). In this state, a voltage of 0.53V was applied between the barrier layer of the test piece and the LiIn alloy, and the test piece was left to stand for 1 hour. The exterior materials of Preparation Examples 2 to 5 and Comparative Preparation Examples 2 to 4 were each disposed in such a manner that the sulfide solid electrolyte was located at a position where a hole of φ1 mm was formed. After a lapse of 1 hour, a surface of the barrier layer at a position in the test piece where the hole of φ1 mm was formed was observed with a microscope to determine whether or not an alloy was formed on the surface of the barrier layer. A test piece having no alloy formed on the surface of the barrier layer was rated as A, and a test piece having an alloy formed on the surface of the barrier layer was rated as C. Table 1 shows the results.

TABLE 1

|  | Time-of-flight secondary ion mass spectrometry of barrier protective layer | | | | | Evaluation on deterioration of barrier layer by constraint in high-pressure pressing |
|---|---|---|---|---|---|---|
|  | Peak intensity | | | Peak intensity ratio | | |
|  | $P_{PO2}$ | $P_{PO3}$ | $P_{CrPO4}$ | $P_{PO2}/P_{CrPO4}$ | $P_{PO3}/P_{CrPO4}$ | |
| Preparation Example 1 | $6.3 \times 10^5$ | $1.0 \times 10^6$ | $3.8 \times 10^4$ | 16.6 | 26.8 | A |
| Preparation Example 2 | $6.3 \times 10^5$ | $1.0 \times 10^6$ | $3.8 \times 10^4$ | 16.6 | 26.8 | A |
| Preparation Example 3 | $6.3 \times 10^5$ | $1.0 \times 10^6$ | $3.8 \times 10^4$ | 16.6 | 26.8 | A |
| Preparation Example 4 | $6.3 \times 10^5$ | $1.0 \times 10^6$ | $3.8 \times 10^4$ | 16.6 | 26.8 | A |
| Preparation Example 5 | $2.4 \times 10^4$ | $2.2 \times 10^4$ | $7.5 \times 10^2$ | 34.9 | 30.8 | A |
| Reference Example 1 | $6.3 \times 10^5$ | $1.0 \times 10^6$ | $3.8 \times 10^4$ | 16.6 | 26.8 | A |
| Comparative Preparation Example 1 | — | — | — | — | — | C |
| Comparative Preparation Example 2 | — | — | — | — | — | C |
| Comparative Preparation Example 3 | — | — | — | — | — | C |
| Comparative Preparation Example 4 | — | — | — | — | — | C |
| Reference Example 2 | — | — | — | — | — | C |

<Production Example of all-Solid-State Battery>

An all-solid-state battery 70 as shown in the schematic diagram of FIG. 2 was prepared. Specifically, in a dry environment at a dew point of −50° C. or lower, a positive electrode layer 30 having $LiCoO_2$ laminated as a positive active material layer 31 (thickness: 100 μm) on an aluminum alloy foil as a positive electrode current collector 32 (thickness: 20 μm), and a negative electrode layer 20 having graphite laminated as a negative active material layer 21 (thickness: 120 μm) on a SUS 304 foil as a negative electrode current collector 22 (thickness: 10 μm) were laminated with a solid electrolyte layer ($Li_2S:P_2S_5$=75:25, thickness: 100 μm) interposed therebetween to prepare a unit cell 50. In a plan view of the all-solid-state battery, the positive active material layer 31 has a length of 30 mm and a width of 30 mm, the positive electrode current collector 32 has a length of 40 mm and a width of 35 mm, the negative active material layer 21 has a length of 32 mm and a width of 32 mm, the negative electrode current collector 22 has a length of 40 mm and a width of 35 mm, and the solid electrolyte layer has a length of 32 mm and a width of 32 mm. A plurality of these unit cells were laminated to form a battery element. A terminal 60 was bonded to each of the positive electrode current collector 32 and the negative electrode current collector 22 of the battery element.

Next, two exterior materials (having a length of 60 mm and a width of 60 mm) obtained in Preparation Example 4 were prepared. A concave portion (having a length of 42 mm and a width of 37 mm) protruding from the heat-sealable resin layer side to the barrier layer side was formed at the center of the exterior material using a mold. Next, the battery element was sandwiched vertically in such a manner that the heat-sealable resin layers of the two exterior materials provided with the concave portion were opposed to each other, and the peripheral edge portion of the exterior material was heat-sealed in a vacuum environment to prepare an all-solid-state battery.

Thus, the present disclosure provides an invention of an aspect as described below.

Item 1. An all-solid-state battery having a battery element contained in a packaging formed from an exterior material, the battery element including at least a unit cell including: a positive active material layer; a negative active material layer; and a solid electrolyte layer laminated between the positive active material layer and the negative active material layer, the exterior material including a laminate including at least a barrier layer, a barrier layer protective film formed on a surface of the barrier layer, and a heat-sealable resin layer in this order.

Item 2. The all-solid-state battery according to item 1, wherein the all-solid-state battery has a rectangular shape in plan view, and in the all-solid-state battery having a rectangular shape in plan view, the ratio of a length of a first side to a length of a second side perpendicular to the first side is 1:1 to 1:5.

Item 3. The all-solid-state battery according to item 2, wherein the battery element is housed in a molded part having a rectangular shape in plan view, the molded part having the exterior material protruding from the heat-sealable resin layer side to the barrier layer side, and the all-solid-state battery includes a first curved portion and a second curved portion in this order from a center part to an end part of the exterior material in a cross section in a thickness direction of the exterior material on a straight line which is parallel to two sides parallel to each other in a rectangular molded part and passes through a middle of the two sides in plan view of the all-solid-state battery from the barrier layer side, and the first curved portion has an R value (curvature radius) of 1 mm or more.

Item 4. The all-solid-state battery according to item 3, wherein in the all-solid-state battery having a rectangular shape in plan view, the first side is a short side and the second side is a long side, and in the cross-section, the R value (curvature radius) in the first curved portion along the short side of the all-solid-state battery having a rectangular shape in plan view is larger than the R value (curvature radius) in the first curved portion along the long side.

Item 5. The all-solid-state battery according to item 3 or 4, wherein the molded part of the exterior material is formed on both sides of the all-solid-state battery.

Item 6. The all-solid-state battery according to any one of items 1 to 5, wherein when the barrier layer protective film is analyzed by time-of-flight secondary ion mass spectrometry, the ratio of a peak intensity $P_{PO3}$ derived from $PO_3^-$ to a peak intensity $P_{CrPO4}$ derived from $CrPO_4^-$ ($P_{PO3/CrPO4}$) is preferably within the range of 6 or more and 120 or less.

Item 7. A method for manufacturing an all-solid-state battery, the method including a housing step of housing a battery element in a packaging formed from an exterior material, the battery element including at least a unit cell including: a positive active material layer; a negative active material layer; and a solid electrolyte layer laminated between the positive active material layer and the negative active material layer, the exterior material including a laminate including at least a barrier layer, a barrier layer protective film formed on a surface of the barrier layer protective film, and a heat-sealable resin layer in this order.

DESCRIPTION OF REFERENCE SIGNS

1: Base material layer
2: Adhesive agent layer
3: Barrier layer
3a, 3b: Barrier layer protective film
4: Heat-sealable resin layer
5: Adhesive layer
6: Surface coating layer
10: Exterior material
20: Negative electrode layer
21: Negative active material layer
22: negative electrode current collector
30: Positive electrode layer
31: Positive active material layer
32: Positive electrode current collector
40: Solid electrolyte layer
50: Unit cell
60: terminal
70: all-solid-state battery
M: Molded part
R1y, R1z: first curved portion
R2y, R2z: second curved portion

The invention claimed is:

1. An all-solid-state battery continuously constrained in a high-pressure state from the outside having a battery element contained in a packaging formed from an exterior material, the battery element comprising at least a unit cell including: a positive active material layer; a negative active material layer; and a solid electrolyte layer laminated between the positive active material layer and the negative active material layer, the exterior material including a laminate including at least a barrier layer, a barrier layer protective film formed on a surface of the barrier layer, and a heat-sealable resin layer in this order from an outer side, wherein:
the barrier layer is at least one of a metal foil, a deposited film, and a resin layer having a barrier property,
the barrier layer protective film contains chromium,
a pressure of the high-pressure state is 1 MPa or more and 100 MPa or less, and
when the barrier layer protective film is analyzed by time-of-flight secondary ion mass spectrometry, the ratio of a peak intensity $P_{PO3}$ derived from $PO_3^-$ to a peak intensity $P_{CrPO4}$ derived from $CrPO_4^-$ ($P_{PO3/CrPO4}$) is within a range of 6 or more and 120 or less.

2. The all-solid-state battery according to claim 1, wherein the all-solid-state battery has a rectangular shape in plan view, and in the all-solid-state battery having a rectangular shape in plan view, the ratio of a length of a first side to a length of a second side perpendicular to the first side is 1:1 to 1:5.

3. The all-solid-state battery according to claim 2, wherein the battery element is housed in a molded part having a rectangular shape in plan view, the molded part having the exterior material protruding from the heat-sealable resin layer side to the barrier layer side, and the all-solid-state battery includes a first curved portion and a second curved portion in this order from a center part to an end part of the exterior material in a cross section in a thickness direction of the exterior material on a straight line which is parallel to two sides parallel to each other in a rectangular molded part and passes through a middle of the two sides in plan view of the all-solid-state battery from the barrier layer side, and the first curved portion has a radius of curvature of 1 mm or more.

4. The all-solid-state battery according to claim 3, wherein in the all-solid-state battery having a rectangular shape in plan view, the first side is a short side and the second side is a long side, and in the cross-section, the radius of curvature in the first curved portion along the short side of the all-solid-state battery having a rectangular shape in plan view is larger than the radius of curvature in the first curved portion along the long side.

5. The all-solid-state battery according to claim 3, wherein the molded part of the exterior material is formed on both sides of the all-solid-state battery.

6. A method for manufacturing an all-solid-state battery continuously constrained in a high-pressure state from the outside, the method comprising a housing step of housing a battery element in a packaging formed from an exterior material, the battery element including at least a unit cell including: a positive active material layer; a negative active material layer; and a solid electrolyte layer laminated between the positive active material layer and the negative active material layer, the exterior material including a laminate including at least a barrier layer, a barrier layer protective film formed on a surface of the barrier layer protective film, and a heat-sealable resin layer in this order from an outer side, wherein:
the barrier layer is at least one of a metal foil, a deposited film, and a resin layer having a barrier property,
the barrier layer protective film contains chromium,
a pressure of the high-pressure state is 1 MPa or more and 100 MPa or less, and when the barrier layer protective film is analyzed by time-of-flight secondary ion mass spectrometry, the ratio of a peak intensity $P_{PO3}$ derived from $PO_3^-$ to a peak intensity $P_{CrPO4}$ derived from $CrPO_4^-$ ($P_{PO3/CrPO4}$) is within a range of 6 or more and 120 or less.

* * * * *